(12) United States Patent
Woodyard et al.

(10) Patent No.: US 10,990,948 B1
(45) Date of Patent: *Apr. 27, 2021

(54) SERVER-BASED ORDER PERSISTENCE AND/OR FULFILLMENT

(71) Applicant: Square, Inc., San Francisco, CA (US)

(72) Inventors: Christopher Woodyard, Hoboken, NJ (US); Brad Seiler, New York, NY (US); Roshan Jhunja, Scarsdale, NY (US); Noah Batterson, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 15/685,938

(22) Filed: Aug. 24, 2017

(51) Int. Cl.
*G06Q 20/20* (2012.01)
*G06Q 10/08* (2012.01)

(52) U.S. Cl.
CPC ......... *G06Q 20/203* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 5,878,337 A | 3/1999 | Joao et al. | |
| 7,764,185 B1 | 7/2010 | Manz et al. | |
| 7,810,729 B2 | 10/2010 | Morley, Jr. | |
| 7,835,949 B2 | 11/2010 | Tarvydas et al. | |
| 8,577,810 B1 | 11/2013 | Dalit et al. | |
| 9,443,262 B1* | 9/2016 | Mamgain | G06Q 30/0631 |
| 9,721,251 B1* | 8/2017 | Jen | G06Q 20/40 |
| 10,586,222 B1* | 3/2020 | Woodyard | G06Q 20/202 |
| 10,755,275 B1 | 8/2020 | Jen et al. | |
| 2003/0014317 A1 | 1/2003 | Siegel et al. | |
| 2003/0204447 A1 | 10/2003 | Dalzell et al. | |
| 2005/0055582 A1 | 3/2005 | Bazakos et al. | |
| 2006/0064373 A1 | 3/2006 | Kelley | |

(Continued)

FOREIGN PATENT DOCUMENTS

| | | |
|---|---|---|
| AU | 2017322412 A1 | 5/2019 |
| WO | 2018/049185 A1 | 3/2018 |

OTHER PUBLICATIONS

Non-Final Office Action dated May 16, 2019, for U.S. Appl. No. 15/662,998, of Jen, M., et al., filed Jul. 28, 2017.

(Continued)

*Primary Examiner* — Fateh M Obaid
(74) *Attorney, Agent, or Firm* — Lee & Hayes, P.C.

(57) ABSTRACT

Sever-based order persistence and/or fulfillment is described herein. In an example, server(s) associated with a payment processing service may receive, from a point-of-sale (POS) device associated with a merchant, an order associated with at least one item available for purchase from a physical location of the merchant. The server(s) may store the order in a storage data structure. In an example, the server(s) may determine an occurrence of a trigger event and may update a status of the order based at least in part on the trigger event. In some examples, the trigger event may correspond to an interruption in a connection with the POS device, fulfillment of the order, etc. The status of the order can indicate whether the order is to be sent to the POS device, removed from the storage data structure, etc.

20 Claims, 9 Drawing Sheets

(56) References Cited

U.S. PATENT DOCUMENTS

| | | |
|---|---|---|
| 2006/0089907 A1 | 4/2006 | Kohlmaier et al. |
| 2007/0136140 A1 | 6/2007 | Smith, Jr. |
| 2008/0177624 A9 | 7/2008 | Dohse |
| 2008/0197188 A1 | 8/2008 | Jagatic et al. |
| 2009/0012865 A1 | 1/2009 | Celik |
| 2010/0075445 A1* | 3/2010 | Beaulieu ............... H01J 31/507 438/20 |
| 2010/0269059 A1 | 10/2010 | Olthmer et al. |
| 2011/0125566 A1* | 5/2011 | McLaughlin ...... G06Q 30/0222 705/14.23 |
| 2012/0078767 A1* | 3/2012 | Clarke ................. G06Q 10/087 705/35 |
| 2012/0191522 A1* | 7/2012 | McLaughlin .......... G06Q 50/01 705/14.23 |
| 2013/0024364 A1* | 1/2013 | Shrivastava ........... G06Q 20/38 705/39 |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0246207 A1 | 9/2013 | Novak et al. |
| 2013/0246301 A1 | 9/2013 | Radhakrishnan et al. |
| 2014/0006190 A1 | 1/2014 | Loomis, III et al. |
| 2014/0040145 A1* | 2/2014 | Ozvat .................. G06Q 20/401 705/64 |
| 2014/0040148 A1* | 2/2014 | Ozvat ................ G06Q 20/3829 705/71 |
| 2014/0052633 A1 | 2/2014 | Gandhi |
| 2014/0101050 A1* | 4/2014 | Clarke ............... G06Q 20/4016 705/44 |
| 2014/0114860 A1* | 4/2014 | Ozvat .................. G06Q 20/382 705/64 |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0288981 A1 | 9/2014 | Rajkarnikar et al. |
| 2015/0026037 A1* | 1/2015 | Thompson ........... G06Q 40/025 705/38 |
| 2015/0127476 A1* | 5/2015 | Skiba .................. G06Q 20/204 705/17 |
| 2015/0248664 A1* | 9/2015 | Makhdumi ........ G06Q 20/3274 235/380 |
| 2015/0294312 A1* | 10/2015 | Kendrick ............... G06Q 20/40 705/44 |
| 2016/0042381 A1* | 2/2016 | Braine ............... G06Q 30/0215 705/14.17 |
| 2019/0066089 A1* | 2/2019 | Miryala ............. G06Q 20/3674 |

OTHER PUBLICATIONS

Non-Final Office Action dated Jul. 17, 2019, for U.S. Appl. No. 15/685,897, of Woodyard, C., et al., filed Aug. 24, 2017.
Notice of Allowance dated Oct. 30, 2019, for U.S. Appl. No. 15/685,897, of Woodyard, C., et al., filed Aug. 24, 2017.
Final Office Action dated Nov. 18, 2019, for U.S. Appl. No. 15/662,998, of Jen, M., et al., filed Jul. 28, 2017.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Munson, J., and Gupta, V.K., "Location-Based Notification as a General-Purpose Service," dated Sep. 28, 2002, Retrieved from the Internet URL—https://ai2-52-pdfs.s3.amazonaws.com/1 bb5/6ae0a70b030e2f2376ed246834bddcabd27b.pdf, pp. 40-44.
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Nov. 17, 2016, for U.S. Appl. No. 14/701,571, of Jen, M., et al., filed May 1, 2015.
Notice of Allowance dated Mar. 23, 2017, for U.S. Appl. No. 14/701,571, of Jen, M., et al., filed May 1, 2015.
International Search Report and Written Opinion for International Application No. PCT/US2017/050719, dated Nov. 28, 2017.
Examination Report No. 2 for AU Application No. 2017322412 dated Oct. 16, 2020.
Notice of Allowance dated Apr. 8, 2020, for U.S. Appl. No. 15/662,998, of Jen, M., et al., filed Jul. 28, 2017.
Office Action for European Application No. 17768936.1 dated Aug. 26, 2020.
Examination Report No. 1 for AU Application No. 2017322412 dated Jan. 31, 2020.
Reissued Examination Report No. 1 for AU Application No. 2017322412 dated Feb. 13, 2020.

\* cited by examiner

US 10,990,948 B1

SERVER-BASED ORDER PERSISTENCE AND/OR FULFILLMENT

BACKGROUND

Customers typically shop at physical stores (e.g., brick-and-mortar stores) by selecting goods that are arranged on a sales floor and placing the goods in baskets or some other repositories to hold the goods until the customers are ready to pay for the goods. In some examples, a cashier may hold goods at a check-out counter until customers are ready to pay for the goods. When a customer is ready to pay for his or her good(s), a cashier adds each good to an invoice (e.g., by scanning a barcode, manually entering an identification of the good, etc.), determines a total cost for all good(s) in the invoice, and requests payment from the customer for the total cost. Upon receiving payment, the cashier processes a transaction based on the payment from the customer, closes out the invoice, and moves on to the next customer. If the transaction is interrupted, the cashier needs to start again by adding each good to an invoice and so on.

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
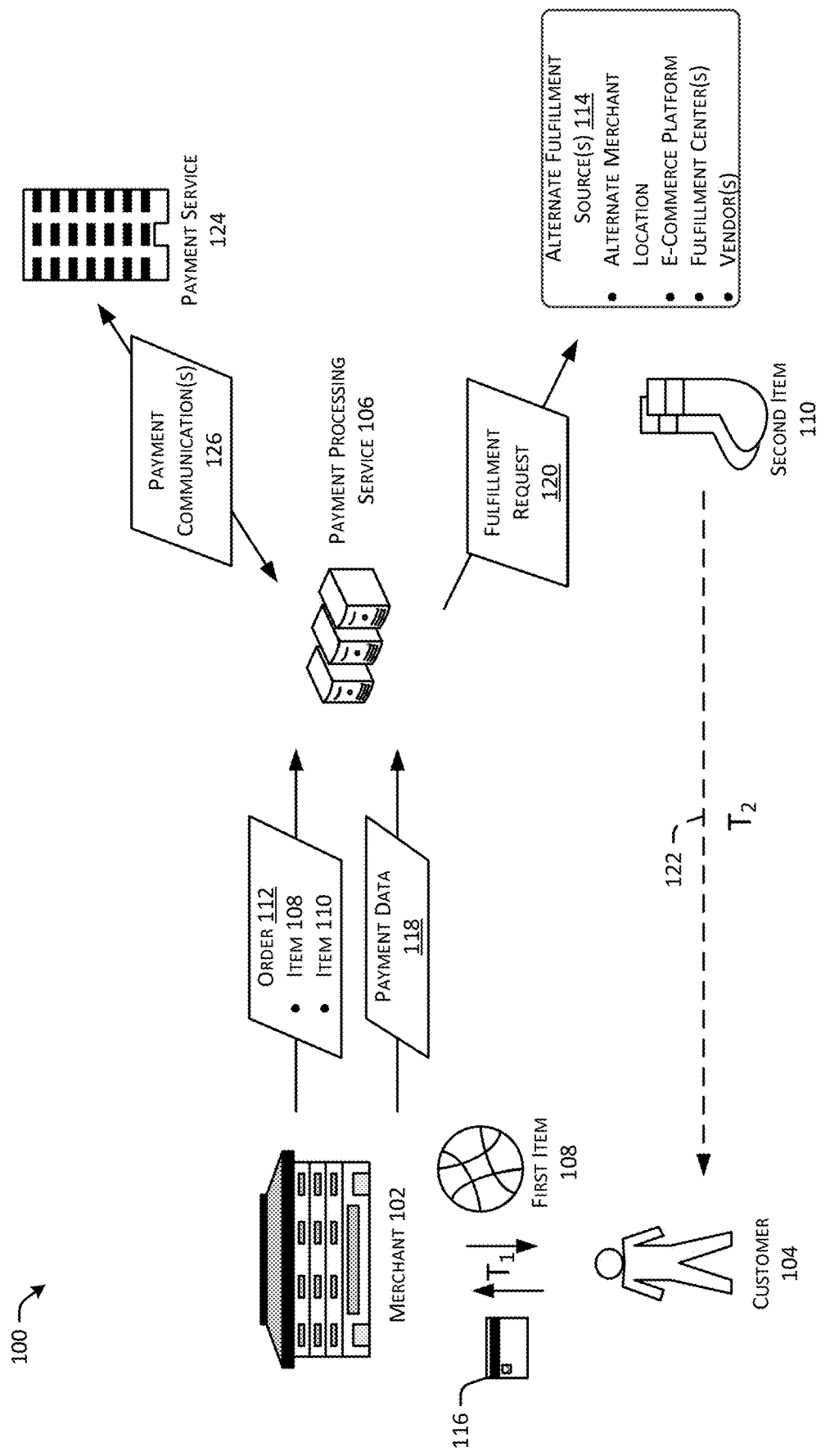
FIG. 1 depicts an illustrative block diagram of a system associated with server-based order persistence and/or fulfillment in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment processing service may process payments between merchant(s) and customer(s). In at least one example, a payment processing service may offer point-of-sale (POS) systems which are associated with various applications of the payment processing service that ease POS interactions with customers. A POS system may include a POS terminal and a payment reader. The payment reader may physically interact with payment instruments such as magnetic stripe payment cards, EMV payment cards, and short-range communication (e.g., near field communication (NFC), radio frequency identification (RFID), Bluetooth®, Bluetooth® low energy (BLE), etc.) payment instruments. The POS terminal may provide a rich user interface, communicate with the payment reader, and also communicate with a server associated with the payment processing service. In this manner, the POS terminal and payment reader may collectively process transaction(s) between a merchant and customer(s) via the payment processing service. Additionally, in some examples, the payment processing service may process transaction(s) associated with POS interactions between customer(s) and a website of the merchant that is associated with various applications of the payment processing service.

In some examples, the payment processing service may additionally and/or alternately provide tools to enable merchants to manage other aspects of their businesses. As an example, the payment processing service may provide a tool for managing an inventory (i.e., inventory services). That is, the payment processing service may provide inventory tracking and reporting via such a tool. A tool for managing inventory may enable a merchant to access and manage a database storing data associated with a quantity of each item that the merchant has available (i.e., an inventory). The merchant may update the inventory following an inventory activity (i.e., where entities associated with the merchant manually determine quantities of each of the items that the merchant has available), upon receiving new item(s) that are to be offered for acquisition, after item(s) are acquired by customers, etc. In additional and/or alternate examples, the payment processing service may update the inventory based on information received from the merchant and/or other sources and/or systems. In at least one example, the inventory may include additional information associated with items in the inventory. For instance, data associated with such additional information may include an identifier of an item, a category of an item, a location of an item (e.g., a particular physical location of a merchant, a fulfillment center, an e-commerce platform, etc.), current ownership of an item (i.e., which merchant in the product supply chain has the item), sale-related events, etc.

The payment processing service may provide various access points to a merchant so that the merchant may access and manage its inventory. As a non-limiting example, the payment processing service may enable a merchant to access and manage its inventory via a web interface, a user interface presented via a device, POS or otherwise, operated by the merchant, etc. Additionally and/or alternatively, the payment processing service may enable a merchant to access and manage its inventory via disparately located device(s) (e.g., device(s) located in different departments of a physical location, device(s) located in different physical locations of a merchant, devices(s) associated with different fulfillment sources of a merchant, etc.). In at least one example, the inventory may be useful for generating inventory reports regarding items in the inventory of a merchant.

Techniques described herein are directed to server-based order persistence and/or fulfillment. In an example, a merchant may leverage a POS device to generate an order. An "order" may be an electronic record of one or more items that a particular customer desires to purchase. That is, an "order" may represent a virtual shopping cart that may include items that have been selected for eventual purchase. As described herein the item(s) may be from various fulfillment sources. That is, a first item associated with an order may be available at a physical location (e.g., a location corresponding to the POS device) and one or more second items associated with an order may be available via a fulfillment source other than the physical location (e.g., an alternate fulfillment source).

In at least one example, an agent (e.g., owner, employee, independent contractor, etc.) of the merchant may interact with a POS device via an input to indicate that a customer intends to purchase an item (e.g., good or service). For instance, the agent may scan an identifier associated with an item via a scanning mechanism associated with the POS device, the agent may manually enter information associated with an item, the agent may select an item from a menu presented via a graphical user interface of the POS device, etc. The POS device may generate a new order based on the interaction. Such an order may be stored locally on the POS device, at least until the POS device sends the order to one or more servers associated with a payment processing service.

At some time after the POS device generates the new order, the POS device may send the order to one or more servers associated with a payment processing service to store the order in association with the payment processing service. In some examples, a customer may desire to add an item to his or her order. An item may be added to an existing order by an additional interaction between an agent and a POS device. Based at least in part on adding an additional item to an order, the POS device may send an update to the one or more servers to ensure that the one or more servers update the order to include the additional item. In at least one example, the servers may determine a fulfillment source associated with the additional item and may indicate that the additional item is reserved.

The one or more servers may store the order until an occurrence of a trigger event, described below. That is, the order may be persistently stored on the one or more servers, remote from the POS device that generated the order, until an occurrence of a trigger event that indicates that the order is to be removed from storage. A trigger event may correspond to an event that prompts a change to a status of an order. In some examples, a trigger event may change a status of an order such to indicate that the order is to be sent to the POS device after the reestablishment of a disrupted connection with the POS device. In such examples, the trigger event may correspond to an interruption in a connection between the POS device and the one or more servers.

In other examples, a trigger event may change a status of an order such to indicate that the order is to be removed from a storage data structure. For instance, in such examples, a trigger event may correspond to fulfillment of an order (e.g., each item of an order has been provided to a customer). Additionally and/or alternately, in such examples, a trigger event may correspond to a lapse of a predetermined amount of time from a most recent interaction with an order. That is, a trigger event may correspond to inactivity for a predetermined amount of time. Moreover, in such examples, a trigger event may correspond to an inability to fulfill an order. For instance, an item may be oversold or otherwise unavailable such that it cannot be fulfilled. That is, a trigger event may correspond to a determination that one or more items of an order have not been fulfilled are not able to be fulfilled, and all other items associated with an order have been fulfilled. In such examples, a trigger event may correspond to a total cost of an order exceeding a threshold. In at least one example, a trigger event may correspond to an explicit indication from merchant 204 and/or a customer to remove an order. Additional and/or alternate trigger events may be imagined.

As described above, techniques described herein are directed to persistently storing an order. Persistently storing an order (until an occurrence of a trigger event) may enable an order to be saved for subsequent access, alleviating the agent from having to generate a new order due to an interruption. For instance, the agent may help other customers prior to the customer finishing his or her transaction, without losing the order. Furthermore, in the event of a power outage or some other network outage and/or unexpected shut-off of the POS device, the order may be saved for subsequent access by the agent. Or, if an order cannot be fulfilled at a particular time, the order may persist until the order is fulfilled. Furthermore, an order stored remotely from the POS device that generated the order may be accessed by other remotely located POS devices.

In some examples, when orders have more than one item, one or more items may be fulfilled by different fulfillment sources and/or at different times. In at least one example, a customer may be at a particular physical location (e.g., a brick-and-mortar store) of a merchant. The customer may desire to purchase one or more items that are available at the particular physical location. Additionally, the customer may desire to purchase an additional item that is not available at the particular physical location. The payment processing service may facilitate determining one or more alternate fulfillment sources that may provide the additional item to the customer. For the purpose of this discussion, a fulfillment source may correspond to an entity that is capable of fulfilling an item of an order. A fulfillment source may correspond to a physical location of a merchant, an e-commerce platform associated with a merchant, a fulfillment center associated with a merchant, a vendor that sells a particular item, etc. For the purpose of this discussion, "fulfillment" refers to providing an item to a customer. For instance, fulfillment of a good may occur when the good is delivered, or otherwise provided, to the customer, fulfillment of a service may occur when the service is provided to the customer, etc.

In at least one example, an agent may add an additional item to the order that is available via an alternate fulfillment source. In such an example, an agent may add the additional item without navigating away from the order. That is, the agent does not need to navigate between the order from the point-of-sale and an e-commerce website, for example, to add the additional item to the order. In some examples, a first item associated with a first fulfillment source and a second item associated with a second fulfillment source may be fulfilled at different times. In such examples, techniques described herein are directed to processing payment for the items after the fulfillment of each item.

As a non-limiting example, the first fulfillment source may be a first physical location of a merchant and the second fulfillment source may be an alternate fulfillment source (e.g., a second physical location of the merchant, an e-commerce platform of the merchant, a fulfillment center associated with the merchant, a vendor that sells the second item, etc.). A customer may leave the first physical location having been provided the first item. That is, the first item may be fulfilled via the first physical location. However, a delay may be associated with fulfillment of the second item from the second fulfillment source. In such an example, techniques described herein are directed to sending an authorization request to a payment service to authorize payment data associated with a total cost of an order at a first time, and sending capture requests to the payment service to capture funds corresponding to a cost of an item of the order when the item is fulfilled. That is, based at least in part on determining fulfillment of the first item at the first physical location, techniques described herein may send a capture request to a payment service to capture a cost of the first item. Subsequently, based at least in part on determining fulfillment of the second item via the second fulfillment source, techniques described herein may send a capture request to a payment service to capture a cost of the second item. An order may persist in the one or more servers of the payment processing service until each item associated with the order has been fulfilled or until an occurrence of another trigger event, which causes the status of the order to indicate that the order is to be removed.

Techniques described herein may enable near real-time synchronization between order(s) placed locally on POS device(s) and order(s) stored remote from the end user(s) (e.g., the POS device(s)) to ensure that an inventory of a merchant is updated in near real-time. Furthermore, techniques described herein enable storing an order on one or more servers to enable subsequent access and thus alleviate an agent from having to generate a new order due to an interruption. For instance, the agent may help other customers prior to the customer finishing his or her transaction, without losing the order. Furthermore, in the event of a power outage or some other network outage and/or unexpected shut-off, the order may be saved for subsequent access by the agent. Or, if an order cannot be fulfilled at a particular time, the order may persist until the order is fulfilled. Accordingly, by storing orders on one or more servers instead of local POS devices, techniques described herein are directed to improvements in conventional POS technologies.

Additionally, by storing an order on one or more servers, techniques described herein enable multiple devices (POS devices or otherwise) to access the order. That is, by moving an order from a local storage associated with a device (POS device or otherwise) to a centralized storage and/or duplicating the order in a centralized storage, multiple devices (POS or otherwise), which may be in disparate locations, can access the order, edit the order, etc.

Furthermore, techniques described herein are directed to managing a single order that may be associated with multiple fulfillment sources. That is, instead of requiring multiple orders for multiple fulfillment sources, techniques described herein conserve computational resources by minimizing the number of orders required to be processed via a payment processing service. Moreover, by streamlining payment processing, techniques described herein reduce the number of authorization requests sent in association with items that are available via alternate fulfillment sources. As such, techniques described herein further conserve computational resources.

Additionally and/or alternately, techniques described herein are directed to dynamically managing orders that are stored on the one or more servers. That is, instead of a plurality of orders being stored on the one or more servers (which are consuming storage resources), techniques described herein are directed to intelligently removing order(s) from storage on the one or more servers based on trigger event(s). As such, techniques described herein proffer another benefit to conventional POS technologies.

FIG. 1 depicts an illustrative block diagram of a system 100 associated with server-based order persistence and/or fulfillment. FIG. 1 shows merchant 102 and customer 104. Merchant 102 may have an associated POS device (not shown) that is supported by payment processing service 106. The POS device may communicate with payment processing service 106 via one or more network(s). Payment processing service 106 processes transactions on behalf of merchant 102, as described above. In practice, payment processing service 106 may process transactions on behalf of multiple merchants.

Merchant 102 and customer 104 may interact with each other to complete a transaction in which customer 104 acquires a first item 108 and a second item 110, and in return, customer 104 provides payment to merchant 102. The term "transaction" includes any interaction for the acquisition of an item in exchange for payment. The term "item" may include goods and/or services. The term "customer" includes any entity that acquires items from a merchant, such as by purchasing, renting, leasing, borrowing, licensing, or the like. The term "merchant" includes any business engaged in the offering of items for acquisition by customers. Actions attributed to a merchant may include actions performed by owners, employees, or other agents of the merchant via a corresponding POS device.

Merchant 102 may interact with a POS device, as described above. In some types of businesses, a POS device may be located in a store or other place of business of merchant 102 (e.g., a physical location), and thus may be at a fixed location that does not change on a day-to-day basis. In other types of businesses, however, the location of a POS device may change from time to time, such as in the case that a merchant operates a food truck, is a street vendor, is a cab driver, etc., or has an otherwise mobile business, e.g., in the case of merchants who sell items at buyers' homes, places of business, and so forth.

In at least one example, merchant 102 may interact with the POS device to indicate that customer 104 intends to purchase first item 108. Responsive to such an interaction, the POS device may generate order 112. Additionally, customer 104 may indicate that he or she desires to purchase second item 110. Merchant 102 may determine that second item 110 is not available at a current location of customer 104. For instance, customer 104 may be at a first physical location of merchant 102 and second item 110 may not be within the inventory of items available for purchase at the physical location of merchant 102. In at least one example, merchant 102 may interact with the POS device to determine an alternate fulfillment source 114 that may fulfill second item 110 for customer 104. As described above, alternate fulfillment sources 114 may include an alternate physical location of merchant 102, an e-commerce platform associated with merchant 102, fulfillment center(s) associated with merchant 102, vendor(s) that sell second item 110, etc. Based on determining that second item 110 is available via alternate fulfillment source(s) 114, the merchant 102 may interact with the POS device to indicate that customer 104 intends to purchase second item 110 via alternate fulfillment source(s) 114. Responsive to such an interaction, the POS device may add second item 110 to order 112.

In at least one example, merchant 102 may send order 112 to payment processing service 106 after order 112 is generated (e.g., with first item 108) or after order 112 is updated (e.g., with second item 110). If merchant 102 sent order 112 to payment processing service 106 after order 112 was generated, merchant 102 may send instructions to payment processing service 106 to update order 112 to include second item 110 after second item 110 is added to order 112. In some examples, merchant 102 may add additional item(s) to order 112 and the POS device may send update(s) to payment processing service 106 to instruct payment processing service 106 to update order 112. In at least one example, merchant 102 may receive an indication that payment processing service 106 received, stored, and/or updated order 112. In at least one example, payment processing service 106 may update an inventory status associated with item(s) (e.g., first item 108, second item 110, etc.) in an inventory of merchant 102 to indicate that the item(s) are reserved for customer 104.

In at least one example, customer 104 may provide an indication that he or she desires to complete a transaction (e.g., check-out). When customer 104 and merchant 102 enter into a transaction, merchant 102 interacts with a POS device to provide payment information. Customer 104 may provide payment to merchant 102 using cash or another payment instrument 116. The POS device may include a payment reader. The payment reader may receive payment data 118 associated with payment instrument 116 via an interaction between the payment reader and payment instrument 116. Payment instruments (e.g., payment instrument 116) may include, but are not limited to, magnetic stripe payment cards, EMV payment cards, and short-range communication (e.g., NFC, RFID, Bluetooth®, BLE, etc.) payment instruments, etc. In some examples, payment instrument 116 may be a stored-value card or gift card, a check, cash, etc.

Payment data 118 may include a name of customer 104, an address of customer 104, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to customer 104 (which may or may not match the number associated with the payment instrument), restrictions on what types of charges/debts may be made, etc. In some examples, payment instrument 116 may include one or more magnetic strips and/or other mechanisms (e.g., built-in memory chips, RIFDs, etc.) for providing payment data 118 when payment instrument 116 interacts with a payment reader (e.g., swipe, tap, dip, etc.). In other examples, merchant 102 may input payment data 118 manually via the POS device. Responsive to receiving payment data via the POS device, merchant 102 may send payment data 118 to payment processing service 106.

While the preceding paragraphs describe that payment data 118 is obtained upon an indication that customer 104 desires to complete a transaction, in alternate examples, payment data 118 may be obtained when order 112 is generated or any time between when order 112 is generated and customer 104 indicates a desire to complete a transaction. For instance, in an example, payment data 118 may be obtained when order 112 is generated and may be associated with order 112 until order 112 is removed from storage, as described herein.

As noted above, customer 104 may purchase first item 108 and second item 110 while at a first physical location of merchant 102. However, the first physical location of merchant 102 may only fulfill first item 108 (e.g., at a first time ($T_1$)). Accordingly, payment processing service 106 may determine that second item 110 must be fulfilled by alternate fulfillment source(s) 114 and may send fulfillment request 120 to device(s) associated with alternate fulfillment source(s) 114. Fulfillment request 120 may instruct a particular alternate fulfillment source 114 to retrieve second item 110 and provide second item 110 to customer 104 (as illustrated by dashed line 122). In some examples, the provisioning of second item 110 may require alternate fulfillment source 114 to deliver second item 110 to a location of customer 104 (e.g., via mail, unmanned aerial vehicle, etc.) or that customer 104 retrieve second item 110 at a location corresponding to alternate fulfillment source(s) 114. Nevertheless, second item 110 may be fulfilled by alternate fulfillment source(s) 114 at a second time ($T_2$) that is after the first time ($T_1$).

In response to receiving payment data 118, payment processing service 106 may communicate with payment service 124 via one or more payment communications 126. In at least one example, payment processing service 106 may send a first payment communication 126 corresponding to an authorization request to authorize payment data 118 for a total cost of order 112. In some examples, the authorization request may be sent at a substantially same time as order 112 is stored in storage, as described herein. Payment service 124 may send a second payment communication 126 back to payment processing service 106 to indicate whether payment data 118 is authorized for the total cost of order 112. Then, payment processing service 106 may send a third payment communication 126 to capture an amount of funds associated with a cost of first item 108. That is, payment processing service 106 may send a third payment communication 126 responsive to first item 108 being fulfilled. Payment processing service 106 may receive a fourth payment communication 126 indicating that the amount of funds associated with the cost of first item 108 has been transferred to an account corresponding to merchant 102. Payment processing service 106 may send such information to merchant 102 (e.g., via a POS device associated with merchant 102).

In at least one example, alternate fulfillment source 114 may provide an indication to payment processing service 106 that second item 110 has been fulfilled. That is, alternate fulfillment source 114 may provide an indication to payment processing service 106 that second item 110 has been delivered, or otherwise provided, to customer 104. Then, payment processing service 106 may send a fifth payment communication 126 to capture an amount of funds associated with a cost of second item 110. That is, payment processing service 106 may send a fourth payment communication 126 responsive to second item 110 being fulfilled. Payment processing service 106 may receive a sixth payment communication 126 indicating that the amount of funds associated with the cost of second item 110 has been transferred to an account corresponding to merchant 102 or alternate fulfillment source 114 if alternate fulfillment source 114 is different than merchant 102 (e.g., a vendor). Payment processing service 106 may send such information to merchant 102 (e.g., via a POS device associated with merchant 102) and/or alternate fulfillment source 114 (e.g., via a device associated with alternate fulfillment source 114).

In at least one example, order 112 may be stored at payment processing service 106 until an occurrence of a trigger event that causes the status of order 112 to be changed such to indicate that order 112 is to be removed from storage. Fulfillment of all items of an order may correspond to such a trigger event. Accordingly, based at least in part on determining that first item 108 and second item 110 have been fulfilled, payment processing service 106 may remove order 112 from storage. Additional details associated with trigger events and removing orders from storage are described below.

FIG. 1 illustrates but one example of techniques described herein. Additional details associated with techniques described herein are described below with reference to FIGS. 2-8.

Figure 2:
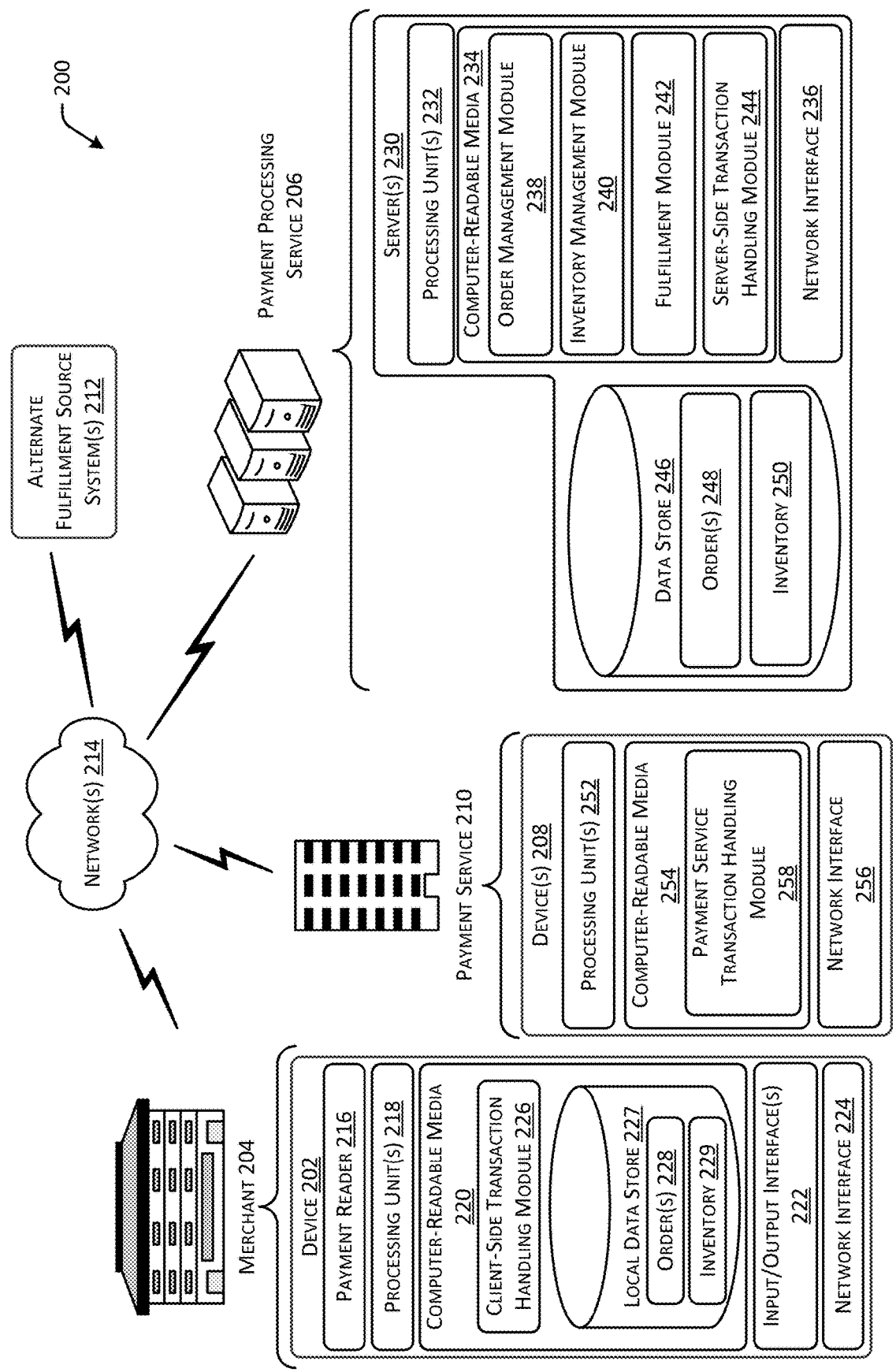
FIG. 2 depicts an illustrative block diagram of another system associated with server-based order persistence and/or fulfillment in accordance with some examples of the present disclosure.

FIG. 2 depicts an illustrative block diagram of a system 200 associated with server-based order persistence and/or fulfillment. The system 200 may include device 202 operated by merchant 204, which is communicatively coupled to payment processing service 206, which are capable of communicating with one or more device(s) 208 operated by payment service 210 and/or alternate fulfillment source system(s) 212, via network(s) 214. Merchant 204 may correspond to merchant 102, payment processing service 206 may correspond to payment processing service 106, and/or payment service 210 may correspond to payment service 124, as described above with reference to FIG. 1. While a single merchant 204 and device 202 are shown, in practice, multiple merchants and multiple devices may communicate with payment processing service 206 to process transactions.

Merchant 204 may operate device 202. Device 202 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. In at least one example, device 202 may be a POS terminal, which may be connected to payment reader 216. In such an example, payment reader 216 may be capable of accepting a variety of payment instruments, such as credit cards, debit cards, gift cards, short-range communication based payment instruments, and the like. In one example, payment reader 216 may be a wireless communication device that communicates wirelessly with device 202, for example, using Bluetooth®, BLE, NFC, RFID, etc. In another example, payment reader 216 may be coupled to device 202, for example, by being insertable into a connector mechanism (e.g., phone jack, headphone jack, etc.) of a smart phone or tablet. That is, in other examples, payment reader 216 may be coupled to device 202 via a wired connection. In additional and/or alternate examples, payment reader 216 may be integral to device 202, as shown in FIG. 2. Payment reader 216 may interact with a payment instrument via a tap, dip, or swipe to obtain payment data associated with a payment instrument, as described above with reference to FIG. 1.

In at least one example, payment reader 216 may include a reader chip and/or a transaction chip which may enable payment reader 216 to control the operations and processing of payment reader 216. In an example, the reader chip may perform functionality to control payment interfaces (e.g., a contactless interface, a contact interface, etc.), a wireless communication interface, a wired interface, a power supply, a user interface (e.g., a signal condition device (FPGA)), etc. Additionally and/or alternately, the transaction chip may perform functionality relating to processing of payment transactions, interfacing with payment instruments, cryptography, and other payment-specific functionality. That is, the transaction chip may access payment data associated with a payment instrument. The payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc., as described above. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionality of reader chip and transaction chip may be embodied in a single chip or a plurality of chips, each including any suitable combination of processing units and computer-readable media to collectively perform the functionalities of reader chip and transaction chip as described herein.

Device 202 may include processing unit(s) 218, computer-readable media 220, input/output interface(s) 222, and network interface 224. Processing unit(s) 218 of device 202 may execute one or more modules and/or processes to cause device 202 to perform a variety of functions, as set forth above and explained in further detail in the following disclosure. In some examples, processing unit(s) 218 may include a central processing unit (CPU), a graphics processing unit (GPU), both CPU and GPU, or other processing units or components known in the art. Additionally, each of processing unit(s) 218 may possess its own local memory, which also may store program modules, program data, and/or one or more operating systems. Depending on the exact configuration and type of device 202, computer-readable media 220 may include volatile memory (such as RAM), non-volatile memory (such as ROM, flash memory, miniature hard drive, memory card, or the like), or some combination thereof. In various examples, device 202 may include input/output interface(s) 222. Examples of input/output interface(s) 222 may include a keyboard, a mouse, a pen, a voice input device, a touch input device, a display, etc. Furthermore, device 202 may include network interface 224 for interfacing with network(s) 214, as described below.

In at least one example, computer-readable media 220 may include one or more modules to enable a merchant, e.g., merchant 204, to manage its business via interactions with payment processing service 206. The one or more modules may be implemented as more modules or as fewer modules, and functions described for the modules may be redistributed depending on the details of the implementation. For the purpose of this discussion, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternate examples, the module(s) may be implemented as computer-readable instructions, various data structures, and so forth via at least one processing unit (e.g., processing unit(s) 218) to configure device 202 to execute instructions and to perform operations described herein. The module(s) may include client-side transaction handling module 226. In some examples, client-side transaction handling module 226 may be associated with a POS application.

In at least one example, computer-readable media 220 may also include a local data store 227 that may include an order(s) database 228 (e.g., a local order storage structure) and/or an inventory database 229 (e.g., a local inventory storage structure). Local data store 227 may be configured to store data so that it may be accessible, manageable, and updatable. In at least one example, order(s) database 228 may store order(s) that have been generated on device 202, at least until the order(s) are sent to payment processing service 206. Inventory database 229 may store data indicative of an inventory of merchant 204. In some examples, order(s) database 228 and inventory database 229 may be associated with individual databases, as illustrated in FIG. 2. In other examples, order(s) database 228 and inventory database 229 may be associated with a single database.

In some examples, inventory database 229 may include a plurality of data items representative of a plurality of items that merchant 204 has available at a particular time at a particular physical location corresponding to the physical location of device 202. In other examples, inventory database 229 may include a plurality of data items representative of a plurality of items that merchant 204 has available at a particular time (without regard to a location of the plurality of items). A data item of the plurality of data items may be mapped to, or otherwise associated with, additional information. The additional information may indicate an identifier of an item, a category of an item, a location of an item (e.g., a particular physical location of merchant 204, a fulfillment center, an e-commerce platform, etc.), current ownership of an item (i.e., which merchant in the product supply chain has the item), sale-related events, etc. In some examples, the additional information can indicate a status of the item, of an item, which may indicate whether the item is available, is reserved for a customer, has been fulfilled, is unavailable, etc., as described below. In some examples, inventory database 229 may include items that are available to merchant 204 via a vendor. In at least one example, inventory database 229 may receive updates from payment processing service 206 at a particular frequency, responsive to a change in inventory, after a lapse of a predetermined period of time, etc.

Client-side transaction handling module 226 may generate order(s) based on input received from merchant 204. As described above, merchant 204 may interact with device 202 to indicate a customer desires to purchase one or more items. For instance, merchant 204 may utilize a scanning device to scan an identifier associated with an item, manually enter information about an item, select an item from a menu presented via a graphical user interface presented via device 202, etc. to indicate that a customer desires to purchase the item. Responsive to receiving the input, client-side transaction handling module 226 may generate an order for the item. As described above, an order may be an electronic record of one or more items that a customer intends to purchase.

In some examples, as described above, device 202 may be located at a first physical location of merchant 204. In at least one example, a customer may desire to purchase an item that does not appear to be available at the first physical location of merchant 204. In at least one example, client-side transaction handling module 226 may send a query to inventory database 229 to determine whether the item is associated with inventory corresponding to the first physical location and/or any other fulfillment source associated with merchant 204. In such an example, client-side transaction handling module 226 may receive a response indicating whether the item is available at the first physical location and/or via one or more alternate fulfillment sources. If, according to inventory database 229, the item is available at the first physical location of merchant 204, merchant 204 may retrieve the item and provide an input via device 202 to indicate that the customer intends to purchase the item. Client-side transaction handling module 226 may generate an order and/or update an order based on such input. If, according to inventory database 229, the item is not available at the first physical location of merchant 204, client-side transaction handling module 226 may present a graphical user interface (via input/output interface(s) 222) that presents the one or more alternate fulfillment source(s) to merchant 204 and merchant 204 may select an alternate fulfillment source for fulfillment of the item. In such an example, client-side transaction handling module 226 may generate an order and/or update an order based on such input.

In some examples, client-side transaction handling module 226 may send a request to payment processing service 206 requesting information about alternate fulfillment source(s) that may be able to fulfill an order for the item that is not available at the first physical location of merchant 204. In such examples, client-side transaction handling module 226 may receive a response indicating one or more alternate fulfillment source(s) that may fulfill an order for the item. In at least one example, client-side transaction handling module 226 may present a graphical user interface (via input/output interface(s) 222) that presents the one or more alternate fulfillment source(s) to merchant 204 and merchant 204 may select an alternate fulfillment source for fulfillment of the item. In such an example, client-side transaction handling module 226 may generate an order and/or update an order based on such input.

In at least one example, client-side transaction handling module 226 may store order(s) locally in order(s) database 228. In at least one example, client-side transaction handling module 226 may send order(s), or portions thereof, to payment processing service 206 for storage. As described below, payment processing service 206 may store a duplicate version of an order remote from device 202. In some examples, client-side transaction handling module 226 may send an order after a new order is generated, after a new item is added to an order, at a particular frequency, after a lapse of a predetermined period of time, etc. In examples where client-side transaction handling module 226 sends an order after a new item is added to an order, client-side transaction handling module 226 may update a locally stored order (e.g., add a new item to the locally stored order) and send instructions to update a duplicate version of the order that is stored at payment processing service 206. In some examples, when device 202 is unable to connect to network(s) 214, the local data store may store order(s) until a successful connection is established and client-side transaction handling module 226 may synchronize locally stored order(s) with remotely stored order(s). In at least one example, order(s) may be stored until they are sent to payment processing service 206, until a trigger event, etc.

Client-side transaction handling module 226 may receive payment data from payment reader 216, described above. In addition to payment data, client-side transaction handling module 226 may receive customer authentication data and/ or other point-of-purchase data from payment reader 216 and/or may determine customer authentication data and/or other point-of-purchase data. Customer authentication data may include data authenticating the customer, such as a password, a personal identification number (PIN), a signature, a biometric indicator, etc. Point-of-purchase data may include data identifying merchant 204, data indicating a cost of the transaction, data indicating item(s) purchased via the transaction, a timestamp associated with the transaction, a datestamp associated with the transaction, etc. The payment data, the customer authentication data, and/or the point-of-purchase data may be associated with transaction data, as described above.

In some examples, client-side transaction handling module 226 may receive payment data in association with generating a new order. In other examples, client-side transaction handling module 226 may receive payment data in association with a customer indication of a desire to close a transaction (e.g., at check-out). In yet an alternate example, client-side transaction handling module 226 may receive payment data at any time between when a new order is generated and when a customer indicates a desire to close a transaction. In at least one example, client-side transaction handling module 226 may associate payment data with a corresponding order, which may be used for identification purposes.

Client-side transaction handling module 226 may exchange communications with payment processing service 206. For instance, in one example, client-side transaction handling module 226 may provide transaction data to payment processing service 206. Additionally, client-side transaction handling module 226 may receive notifications from payment processing service 206 signaling the success (e.g., authorization) or failure (e.g., declination) of authorization requests of the payment data for various transactions. In some examples, client-side transaction handling module 226 may generate user interfaces for presentation via an output interface of input/output interface(s) 222, described above. In some examples, the user interfaces may communicate that a transaction was successful (i.e., payment data is authorized for the transaction), unsuccessful (i.e., payment data is not authorized for the transaction), or requires more information to proceed. In an example where a transaction requires more information to proceed, a user interface may be configured to prompt merchant 204 and/or a customer for additional information to complete a transaction. In such an example, the user interface may be presented via input/output interface(s) 222.

As described above, device 202 may communicate with payment processing service 206 via network(s) 214. Payment processing service 206 may include one or more servers 230. Server(s) 230 may include processing unit(s) 232, computer-readable media 234, and network interface 236. Processing unit(s) 232 of server(s) 230 may execute one or more modules and/or processes to cause server(s) 230 to perform a variety of functions, as set forth above and explained in further detail in the following disclosure. In some examples, processing unit(s) 232 may include a CPU, a GPU, both CPU and GPU, or other processing units or components known in the art. Additionally, each of processing unit(s) 232 may possess its own local memory, which also may store program modules, program data, and/or one or more operating systems. Depending on the exact configuration and type of server(s) 230, computer-readable media 234 may include volatile memory (such as RAM), non-volatile memory (such as ROM, flash memory, miniature hard drive, memory card, or the like), or some combination thereof. Server(s) 230 may include network interface 236 for interfacing with network(s) 214, as described below.

In at least one example, computer-readable media 234 may include one or more modules. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternate examples, the module(s) may be implemented as computer-readable instructions, various data structures, and so forth via at least one processing unit (e.g., processing unit(s) 232) to configure server(s) 230 to execute instructions and to perform operations described herein. The module(s) may include order management module 238, inventory management module 240, fulfillment module 242, and server-side transaction handling module 244.

Server(s) 230 may also include a data store 246, which may include an order(s) database 248 and/or an inventory database 250. Data store 246 may be configured to store data so that it may be accessible, manageable, and updatable. Data store 246 may be communicatively coupled to server(s) 230 or integrated with server(s) 230, as illustrated in FIG. 2. In some examples, order(s) database 248 and inventory database 250 may be associated with individual databases, as illustrated in FIG. 2. In other examples, order(s) database 248 and inventory database 250 may be associated with a single database.

Order management module 238 may be configured to receive order(s), or portions thereof, from device 202. In some examples, order management module 238 may receive an order and may store the order in order(s) database 248. That is, order management module 238 may generate and store a duplicate version of an order in order(s) database 248. In at least one example, order management module 238 may associate an identifier with an order. In additional and/or alternate examples, order management module 238 may associate payment data (if received) with an order. In at least one example, order management module 238 may receive instructions to update an order by adding or removing one or more items from an order that is stored in order(s) database 248. Responsive to receiving the instructions, order management module 238 may effectuate a change to a stored order. That is, order management module 238 may generate a new version of a stored order in order(s) database 248. In at least one example, order management module 238 may send a notification to device 202 indicating that an order has been received, stored, and/or updated.

Order management module 238 may determine the occurrence of trigger event(s) and may update an order status based on an occurrence of a trigger event. As described above, a trigger event may correspond to an event that prompts a change to a status of an order. In at least one example, a trigger event may correspond to an interruption in a connection between a POS device (e.g., device 202) and one or more servers (e.g., server(s) 230). For instance, an interruption may be caused by an absence of network connectivity or a loss of power to a POS device. In such an example, order management module 238 may change a status of an order such to indicate that the order is to be sent to the POS device after the reestablishment of a disrupted connection with the POS device. In at least one example, order management module 238 may change a status of an order based on a state of the order, as described below.

In other examples, a trigger event may correspond to fulfillment of an order (e.g., each item of an order has been provided to a customer). Additionally and/or alternately, a trigger event may correspond to a lapse of a predetermined amount of time from a most recent interaction with an order. That is, a trigger event may correspond to inactivity for a predetermined amount of time. Moreover, a trigger event may correspond to an inability to fulfill an order. For instance, an item may be oversold or otherwise unavailable such that it cannot be fulfilled. That is, a trigger event may correspond to a determination that one or more items of an order have not been fulfilled are not able to be fulfilled, and all other items associated with an order have been fulfilled. In at least one example, a trigger event may correspond to a total cost of an order exceeding a threshold cost. In at least one example, a trigger event may correspond to an explicit indication from merchant 204 and/or a customer to remove an order. Such trigger events may cause order management module 238 to change a status of an order to indicate that the order is to be removed from order(s) database 248.

Additional and/or alternate trigger events may be imagined, which may cause additional and/or alternative status updates.

In at least one example, order management module 238 may manage order(s) in the event of an interruption in a connection between device 202 and server(s) 230. Additional details associated with managing order(s) in the event of such an interruption are described below.

Inventory management module 240 may be configured to manage inventory associated with merchants. Inventory database 250 may store one or more inventories. In at least one example, each merchant may be associated with an inventory. That is, merchant 204 may be associated with an inventory in inventory database 250. An inventory may enable merchant 204 to know the quantity of each item that merchant 204 has available at a particular time. In some examples, an inventory may include a plurality of data items representative of a plurality of items that merchant 204 has available at a particular time. A data item of the plurality of data items may be mapped to, or otherwise associated with, additional information. The additional information may indicate an identifier of an item, a category of an item, a location of an item (e.g., a particular physical location of merchant 205, a fulfillment center, an e-commerce platform, etc.), current ownership of an item (i.e., which merchant in the product supply chain has the item), sale-related events, etc. In at least one example, the additional information may include an inventory status of an item, which may indicate whether the item is available, is reserved for a customer, has been fulfilled, is unavailable, etc. In some examples, an inventory of merchant 204 may include item(s) that merchant 204 has available to it at a particular time (e.g., from a vendor, etc.). Additionally and/or alternately, inventory database 250 may include inventories associated with vendors, etc.

In at least one example, responsive to receiving an order from device 202, inventory management module 240 may modify an inventory status associated with a data item corresponding to an item in the order to indicate that the item(s) associated with the order is reserved for a customer associated with the order. After an item is provided to a customer (i.e., fulfilled), inventory management module 240 may update the inventory to indicate that the item is no longer in the inventory of merchant 204 (in the case of goods) or to indicate that the item has been fulfilled (in the case of services). In some examples, if a customer changes his or her mind and he or she no longer desires an item that he or she previously desired, inventory management module 240 may update the inventory status to indicate that the item that was previously reserved is available.

In at least one example, inventory management module 240 may monitor a location of a customer. For instance, inventory management module 240 may receive global positioning system (GPS) data associated with a device operated by the customer (e.g., mobile phone, wearable device, etc.). Or, inventory management module 240 may receive a check-in from a POS device (e.g., device 202) indicating a location of the customer. In some examples, an item may be available from a particular location of merchant 204. In such examples, inventory management module 240 may compare the location of the customer with location(s) of merchant 204 (e.g., predetermined location, location of a POS device at a location, etc.). Inventory management module 240 may determine that a location of a customer is within a threshold distance of the particular location of merchant 204. Based on determining that the location of the customer is within a threshold distance of the particular location of merchant 204, inventory management module 240 may change the inventory status associated with a particular item to indicate that the item is fulfilled (and thus unavailable).

Fulfillment module 242 may be configured to determine a fulfillment source for fulfilling one or more items associated with an order. In some examples, fulfillment module 242 may determine a fulfillment source for fulfilling one or more items associated with an order based on an indication associated with the order. For instance, in some examples, device 202 may include functionality to determine fulfillment source(s) for individual item(s) of an order. In such examples, the order may indicate fulfillment source(s) associated with each item of an order and fulfillment module 242 may determine a fulfillment source for fulfilling each item of the order based on such an indication.

In an additional and/or alternate example, responsive to receiving an order, fulfillment module 242 may access inventory database 250 to determine whether each item associated with the order may be fulfilled by merchant 204 at a current physical location of a customer. In at least one example, an order may be associated with an identifier identifying a location of device 202. Fulfillment module 242 may determine whether a data item representative of an item is associated with inventory corresponding to the location of device 202. If an item is not associated with the inventory corresponding to the location of device 202, fulfillment module 242 may perform a search (e.g., a look-up, etc.) of inventory database 250 to determine whether an item is available via an alternate fulfillment source. That is, fulfillment module 242 may determine whether a data item representative of the item is mapped to, or otherwise associated with, an alternate fulfillment source. In some examples, responsive to determining that an item is available via an alternate fulfillment source, fulfillment module 242 may send a notification to device 202 to identify which alternate fulfillment source the item is available from. In examples where the item is available from more than one alternate fulfillment source, fulfillment module 242 may send the notification to device 202 and may prompt device 202 for feedback regarding a preferred alternate fulfillment source. In alternate examples, fulfillment module 242 may select an alternate fulfillment source without input from merchant 204. In such examples, fulfillment module 242 may select an alternate fulfillment source based on price of an item, delivery options, length of time until fulfillment, customer preferences, etc.

In at least one example, fulfillment module 242 may generate a fulfillment request for an item that is available from an alternate fulfillment source. For the purpose of this discussion, a fulfillment request may correspond to an instruction to provide an item to a customer. In some examples, a fulfillment request may include information about the item and/or information about the customer (e.g., identification, address, arrival time, delivery window, etc.) to enable the alternate fulfillment source to fulfill the item. As described above, an alternate fulfillment source may be a second physical location of merchant 204, an e-commerce platform associated with merchant 204, a fulfillment center associated with merchant 204, a vendor that provides items to merchant 204, etc. The fulfillment module 242 may send the fulfillment request to alternate fulfillment source system 212 to facilitate fulfillment of the item. In some examples, an alternate fulfillment source system 212 may correspond to an alternate device that is located at a second location of merchant 204 (e.g., a POS device at a second location of merchant 204) or a service provider managing an e-commerce platform and/or fulfillment center of merchant 204. In some examples, such a service provider may be payment processing service 206. In other examples, an alternate fulfillment source system 212 may correspond to a device and/or service provider associated with a vendor, etc. In at least one example, the fulfillment request may cause a notification to be presented via a user interface of the alternate device that provides an instruction for fulfillment of the item. In some examples, fulfillment module 242 may receive an indication from alternate fulfillment source system 212 that an item associated with a fulfillment request has been provided to a customer (e.g., fulfilled).

Server-side transaction handling module 244 may be configured to send payment communication(s) to payment service 210, as described below. In at least one example, server-side transaction handling module 244 may send authorization request(s) (e.g., to request authorization of payment data for a cost of a transaction), capture request(s) (e.g., to capture funds for the cost of a transaction, a cost of a portion of a transaction, etc.), etc. to payment service 210. For instance, server-side transaction handling module 244 may send an authorization request for authorization of a particular payment instrument for a particular amount (e.g., a cost of a transaction). In such examples, the authorization request may include payment data, as described above. In at least one example, the server-side transaction handling module 244 may receive indication(s) as to whether authorization request(s), capture request(s), etc. are approved, processing, etc. In some examples, server-side transaction handling module 244 may send indication(s) to device 202 (or alternate fulfillment source system(s) 212) regarding a status of a transaction (e.g., payment data authorized, funds captured, transaction failed, etc.).

As described above, payment processing service 206 may communicate with payment service 210 via network(s) 214 to process transaction(s). For the purpose of this discussion, payment service 210 may be a card network (or "card payment network") (e.g., VISA®, MASTERCARD®), one or more banks, processing/acquiring services, or the like, over network(s) 214 to conduct financial transactions electronically. For example, payment service 210 may be an acquiring bank, an issuing bank, and/or a bank maintaining customer accounts for electronic payments. An acquiring bank may be a registered member of a card association (e.g., VISA®, MASTERCARD®), and may be part of a card payment network. An issuing bank may issue payment cards to customers, and may pay acquiring banks for purchases made by cardholders to which the issuing bank has issued a payment card. Accordingly, in some examples, payment service 210 associated with an acquiring bank may be included in the system 200 and may communicate with payment service 210 associated with a card-issuing bank to obtain payment. Further, in some examples, a customer may use a debit card or gift card instead of a credit card, in which case, payment service 210 associated with a bank or other institution corresponding to the debit card or gift card may receive communications regarding a transaction in which the customer is participating. Additionally, there may be payment services of other financial institutions involved in some types of transactions or in alternate system architectures, and thus, the foregoing are merely several examples for discussion purposes.

In at least one example, payment service 210 may include one or more devices 208, as described above. In some examples, the device(s) 208 may be one or more servers and/or another type of device. For instance, a device of the device(s) 208 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc.

The device(s) 208 may include processing unit(s) 252, computer-readable media 254, and network interface 256. Processing unit(s) 252 may execute one or more modules and/or processes to cause the device(s) 208 to perform a variety of functions, as set forth above and explained in further detail in the following disclosure. In some examples, processing unit(s) 252 may include a CPU, a GPU, both CPU and GPU, or other processing units or components known in the art. Additionally, each of processing unit(s) 252 may possess its own local memory, which also may store program modules, program data, and/or one or more operating systems. Depending on the exact configuration and type of the device(s) 208, computer-readable media 254 may include volatile memory (such as RAM), non-volatile memory (such as ROM, flash memory, miniature hard drive, memory card, or the like), or some combination thereof. The device(s) 208 may include network interface 256 for interfacing with network(s) 214, as described below.

In at least one example, computer-readable media 254 may include one or more modules for processing transactions. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternate examples, the module(s) may be implemented as computer-readable instructions, various data structures, and so forth via at least one processing unit (e.g., processing unit(s) 252) to configure the device(s) 208 to execute instructions and to perform operations described herein. The module(s) may include payment service transaction handling module 258.

Payment service transaction handling module 258 may exchange communications with server-side transaction handling module 244. In at least one example, server-side transaction handling module 244 may send authorization request(s) (e.g., to request authorization of payment data for a cost of a transaction), capture request(s) (e.g., to capture funds for the cost of a transaction, a cost of a portion of a transaction, etc.), etc. to payment service 210. For instance, server-side transaction handling module 244 may send an authorization request for authorization of a particular payment instrument for a particular amount (e.g., a cost of a transaction). In such examples, the authorization request may include payment data, as described above. Furthermore, server-side transaction handling module 244 may send capture request(s) to capture funds associated with particular amount(s) (e.g., a cost of one or more items). In such examples, the capture request may include payment data, as described above. In at least one example, the payment service transaction handling module 258 may send communications indicating whether authorization request(s), capture request(s), etc. are approved, processing, etc.

Network(s) 214 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 214 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, device 202, device(s) 208, server(s) 230 and/or alternate fulfillment source system(s) 212 may communicatively couple to network(s) 214 in any manner, such as by a wired or wireless connection. Network(s) 214 may also facilitate communication between device 202, device(s) 208, server(s) 230 and/or alternate fulfillment source system(s) 212. In turn, network interfaces (e.g., network interface 224, network interface 236, and/or network interface 256) may be any network interface hardware components that may allow device 202, device(s) 208, server(s) 230 and/or alternate fulfillment source system(s) 212 to communicate over network(s) 214. In some examples customer 104 may operate a device (not shown), which may communicate with device 202 via network(s) 214.

FIGS. 3-8 illustrate various processes in accordance with some examples of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternate processes, and not all of the blocks need be executed. For discussion purposes, the processes are described with reference to the environments, architectures and systems described in the examples herein, although the processes may be implemented in a wide variety of other environments, architectures and systems.

FIGS. 3-8 are described below with reference to system 200 described above with reference to FIG. 2. However, it should be noted that such processes are not limited to such an system.

Figure 3:
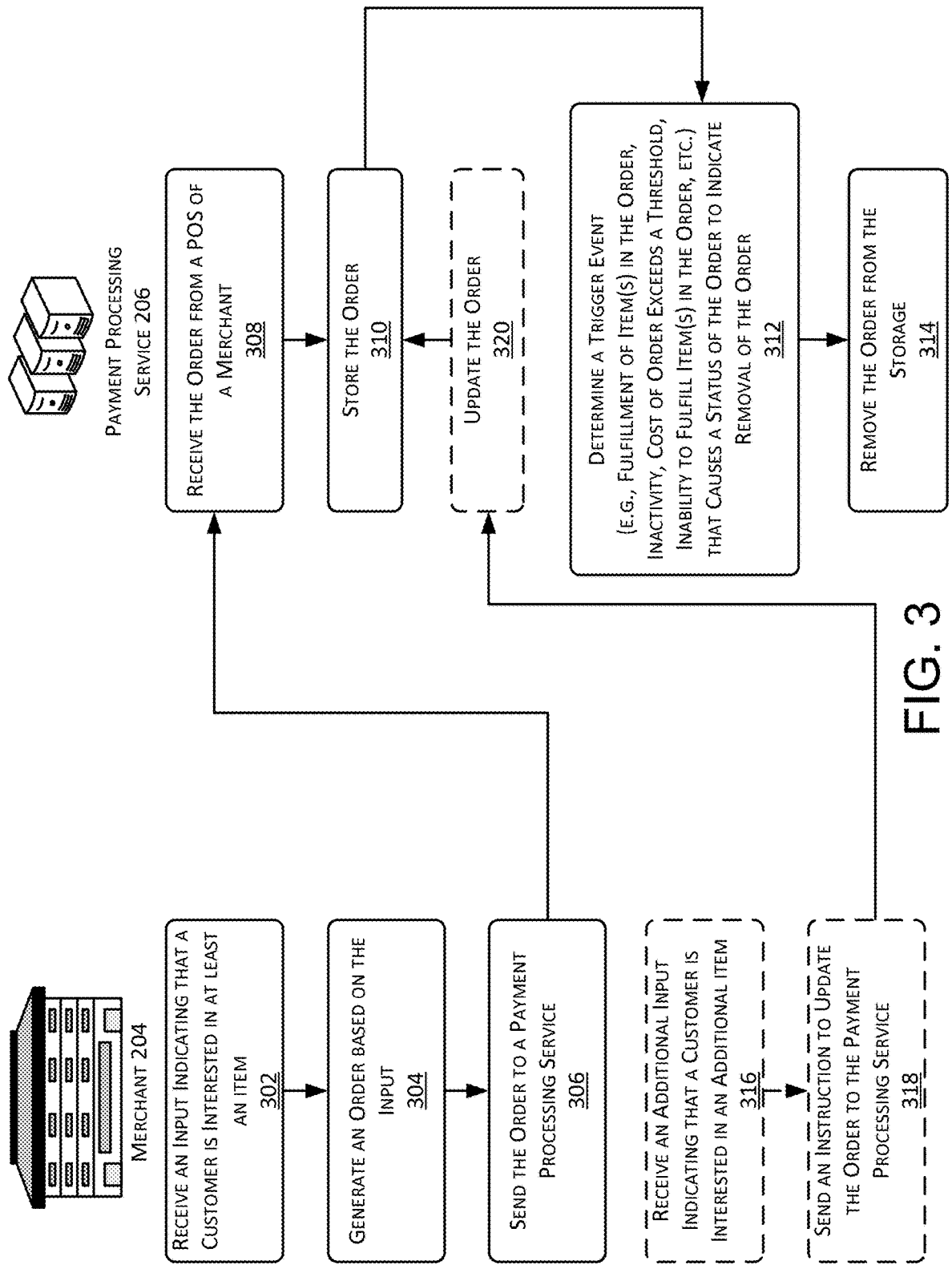
FIG. 3 depicts a non-limiting flow diagram illustrating a process for storing and maintaining an order in accordance with some examples of the present disclosure.

FIG. 3 depicts a non-limiting flow diagram illustrating a process 300 for storing and maintaining an order. Blocks illustrated in the left column may be performed by device 202, associated with merchant 204, and blocks illustrated in the right column may be performed by server(s) 230, which are associated with payment processing service 206.

Block 302 illustrates receiving an input indicating that a customer is interested in at least an item. As described above, merchant 204 may interact with device 202 to indicate a customer desires to purchase one or more items. For instance, merchant 204 may utilize a scanning device to scan an identifier associated with an item, manually enter information about an item, select an item from a menu presented via a graphical user interface presented via device 202, etc. to indicate that a customer desires to purchase the item.

Block 304 illustrates generating an order based on the input. Responsive to receiving the input, client-side transaction handling module 226 may generate an order for the item. As described above, an order may be an electronic record of one or more items that a customer intends to purchase. In at least one example, upon generation of the order, client-side transaction handling module 226 may store the order locally in order(s) database 228. In at least one example, a locally stored order may be stored for a predetermined amount of time, until the order is send to payment processing service 206, until an occurrence of a trigger event, etc.

Block 306 illustrates sending the order to a payment processing service. In at least one example, client-side transaction handling module 226 may send order(s), or portions thereof, to payment processing service 206 for storage. In some examples, client-side transaction handling module 226 may send a duplicate order, or portion thereof, to payment processing service 206 while maintaining a version of the order in order(s) database 228.

Block 308 illustrates receiving the order from a device of a merchant. In some examples, order management module 238 may receive an order from device 202.

Block 310 illustrates storing the order. In some examples, order management module 238 may store the order in order(s) database 248. That is, order management module 238 may generate and store a duplicate version of an order in order(s) database 248. In at least one example, order management module 238 may associate an identifier with an order. In additional and/or alternate examples, order management module 238 may associate payment data (if received) with an order.

Block 312 illustrates determining a trigger event that causes a status of the order to indicate removal of the order. In at least one example, an order may be stored in order(s) database 248 until an occurrence of a trigger event which causes a status of an order to indicate that the order is to be removed from a database (e.g., order(s) database 228 and/or a remote database, described below). As described above, a trigger event may correspond to an event that prompts a change to a status of an order.

In at least one example, a trigger event may correspond to fulfillment of an order (e.g., each item of an order has been provided to a customer). In such an example, order management module 238 may determine that each item of the order has been provided to a customer and may determine a trigger event. That is, order management module 238 may track fulfillment of each item of an order and may determine a trigger event when each item of the order is fulfilled. Additionally and/or alternately, a trigger event may correspond to a lapse of a predetermined amount of time from a most recent interaction with an order. That is, a trigger event may correspond to inactivity for a predetermined amount of time. In such an example, order management module 238 may determine that an order has not been modified and/or updated in more than a predetermined amount of time, and accordingly, may determine a trigger event.

Moreover, a trigger event may correspond to an inability to fulfill an item of an order. For instance, an item may be oversold or otherwise unavailable such that it cannot be fulfilled. That is, in such an example, order management module 238 may determine a trigger event based on a determination that one or more items of an order have not been fulfilled are not able to be fulfilled, and all other items associated with an order have been fulfilled. In some examples, a trigger event may correspond to a total cost of an order exceeding a threshold cost. In at least one example, a trigger event may correspond to an explicit indication from merchant 204 and/or a customer to remove an order.

In an example, an order may be associated with a prepaid value. As item(s) are provided to a customer associated with the order, an amount corresponding to each item may be deducted from the prepaid value. In such an example, order management module 238 may determine a trigger event responsive to the prepaid value meeting a threshold value and/or exhaustion of the prepaid value. In some examples, order management module 238 may generate a new order after an order is removed from order(s) database 248.

Additional and/or alternate trigger events may be imagined.

In some examples, responsive to determining a trigger event, order management module 238 may change a status of the order to indicate that the order is to be removed from order(s) database 228 and/or order(s) database 248. In such examples, order management module 238 may send an indication to device 202 to remove a corresponding order from order(s) database 228, if the order has not already been removed. In additional and/or alternative examples, based at least in part on determining a trigger event, order management module 238 may remove the order from order(s) database 248, as illustrated in block 314. In some examples, order management module 238 may send a notification to device 202 (or a device associated with a customer) to request confirmation that the order is to be removed before removing the order. That is, in some examples, the order management module 238 may remove the order based on receiving a confirmation to remove the order from device 202.

In some examples, merchant 204 may add additional item(s) to an existing order. Block 316 illustrates receiving an additional input indicating that a customer is interested in an additional item. In at least one example, a customer may desire to add an additional item to his or her order. In such an example, merchant 204 may interact with device 202 to indicate that a customer desires to purchase an additional item. For instance, merchant 204 may utilize a scanning device to scan an identifier associated with an item, manually enter information about an item, select an item from a menu presented via a graphical user interface presented via device 202, etc. to indicate that a customer desires to purchase the item.

Block 318 illustrates sending an instruction to update the order to the payment processing service. In such an example, client-side transaction handling module 226 may update a locally stored order to include the additional item. Additionally, client-side transaction handling module 226 may send instructions to update a duplicate version of the order that is stored at payment processing service 206 to payment processing service 206.

Block 320 illustrates updating the order. In at least one example, order management module 238 may receive instructions to update an order by adding one or more items from an order that is stored in order(s) database 248. Responsive to receiving the instructions, order management module 238 may effectuate a change to a stored order. That is, order management module 238 may generate a new version of a stored order in order(s) database 248. The updated order can be stored until order management module 238 determines a trigger event, as described above.

It should be noted that in some examples, an order may be updated to add an item, in other examples, merchant 204 may provide input to device 202 to remove an item from an order. In such examples, client-side transaction handling module 226 may send an instruction to server(s) 230 to remove the item from the remotely stored order and order management module 238 may remove the item from the remotely stored order.

Figure 4:
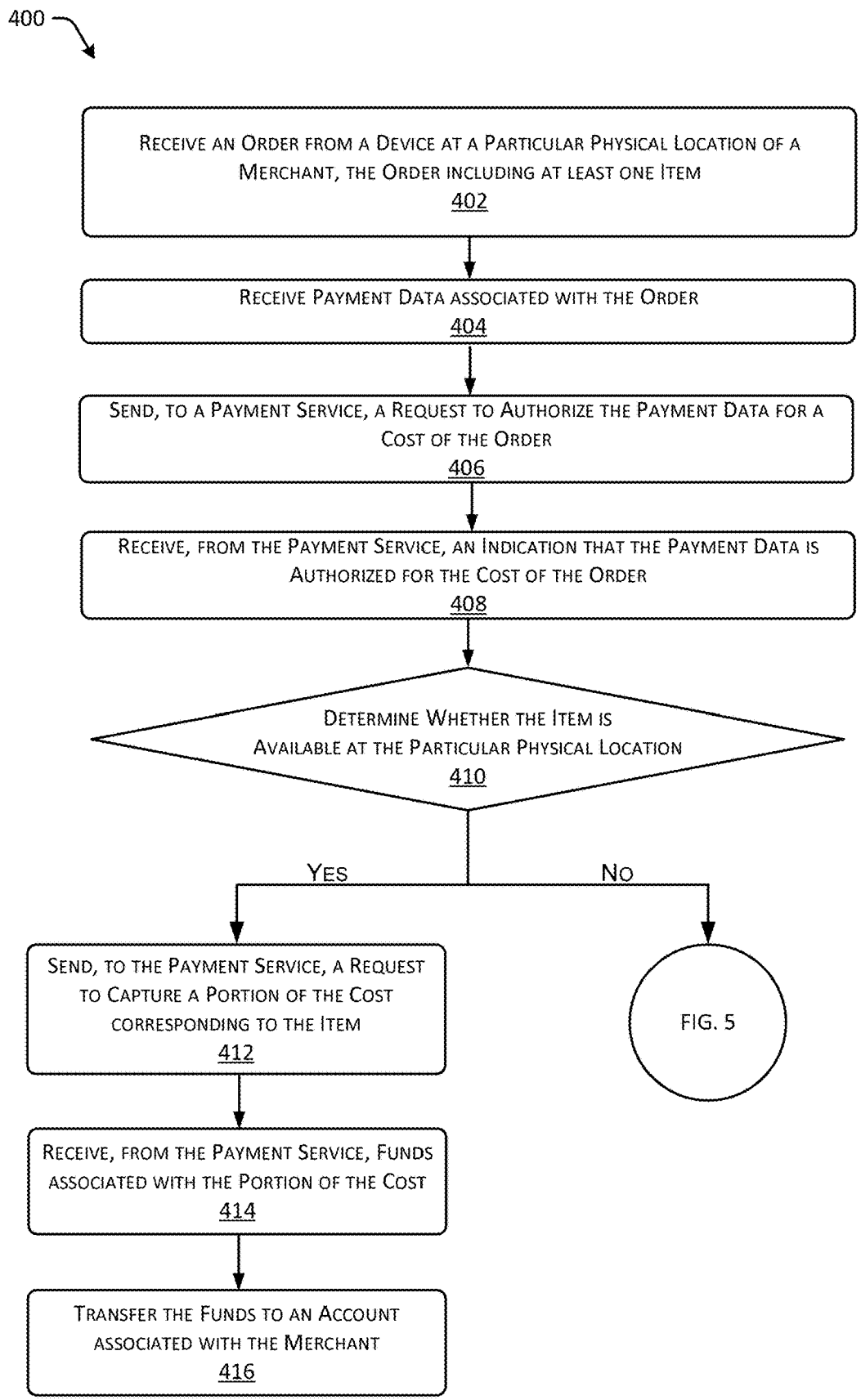
FIG. 4 depicts a non-limiting flow diagram illustrating a process for order fulfillment in accordance with some examples of the present disclosure.

FIG. 4 depicts a non-limiting flow diagram illustrating a process 400 for order fulfillment.

Block 402 illustrates receiving an order from a device at a particular physical location of a merchant, the order including at least an item. As described above, order management module 238 may be configured to receive order(s), or portions thereof, from device 202. In some examples, order management module 238 may receive an order and may store the order in order(s) database 248. That is, order management module 238 may generate and store a duplicate version of an order in order(s) database 248. In at least one example, order management module 238 may associate an identifier with an order, which may correspond to the customer associated with the order.

Block 404 illustrates receiving payment data associated with the order. In at least one example, server-side transaction handling module 244 may receive payment data from device 202. As described above, payment data may include a name of a customer, an address of a customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to a customer (which may or may not match the number associated with the payment instrument), restrictions on what types of charges/debts may be made, etc. In some examples, order management module 238 may retrieve payment data from server-side transaction handling module 244 and may associate the payment data with a corresponding order. In other examples, an order may be associated with payment data when the order is received.

Block 406 illustrates sending, to a payment service, a request to authorize the payment data for a cost of the order. In at least one example, responsive to receiving the payment data, server-side transaction handling module 244 may send an authorization request for authorization of a particular payment instrument for a cost of the order (i.e., cost of one or more items associated with the order). In such examples, the authorization request may include payment data, as described above. In at least one example, as described above, server-side transaction handling module 244 may send an authorization request for authorization at or near the same time that order management module 238 stores the order in order(s) database 248.

Block 408 illustrates receiving, from the payment service, an indication that the payment data is authorized for the cost of the order. Responsive to sending the authorization request, server-side transaction handling module 244 may receive an indication that the payment data is authorized for the cost of the order.

Block 410 illustrates determining whether the item is available at the particular physical location. Fulfillment module 242 may be configured to determine a fulfillment source for fulfilling one or more items associated with an order, as described above. In some examples, fulfillment module 242 may determine a fulfillment source for fulfilling one or more items associated with an order based on an indication associated with the order. For instance, in some examples, device 202 may include functionality to determine fulfillment source(s) for individual item(s) of an order. In such examples, the order may indicate fulfillment source(s) associated with each item of an order and fulfillment module 242 may determine a fulfillment source for fulfilling each item of the order based on such an indication.

In an additional and/or alternate example, responsive to receiving an order, fulfillment module 242 may access inventory database 250 to determine whether each item associated with the order may be fulfilled by merchant 204 at a current physical location of a customer (e.g., the particular physical location). In an example, an order may be associated with an identifier identifying a location of device 202 and the fulfillment module 242 may determine whether a data item representative of an item is associated with inventory corresponding to the location of device 202.

In at least one example, fulfillment module 242 may determine whether the order indicates a fulfillment source of the item. If the order does not indicate a fulfillment source of the item, fulfillment module 242 may determine whether a data item representative of the item is associated with inventory corresponding to the particular physical location.

Based at least in part on determining that an item is available at the particular physical location, server-side transaction handling module 244 may send, to the payment service, a request to capture a portion of the cost corresponding to the item, as illustrated in block 412. In at least one example, responsive to determining that an item is available at the particular physical location (i.e., the item can be fulfilled at the particular physical location), server-side transaction handling module 244 may send a capture request to payment service 210 to capture a portion of the cost of the order that corresponds to a cost of the item. In such examples, the capture request may include payment data, as described above.

Block 414 illustrates receiving, from the payment service, funds associated with the portion of the cost. In at least one example, responsive to sending a capture request to payment service 210, server-side transaction handling module 244 may receive funds associated with the portion of the cost. The server-side transaction handling module 244 may transfer the funds to an account associated with merchant 204, as illustrated in block 416. In an alternate example, server-side transaction handling module 244 may receive an indication that payment service 210 transferred the funds to the account associated with merchant 204 directly.

Figure 5:
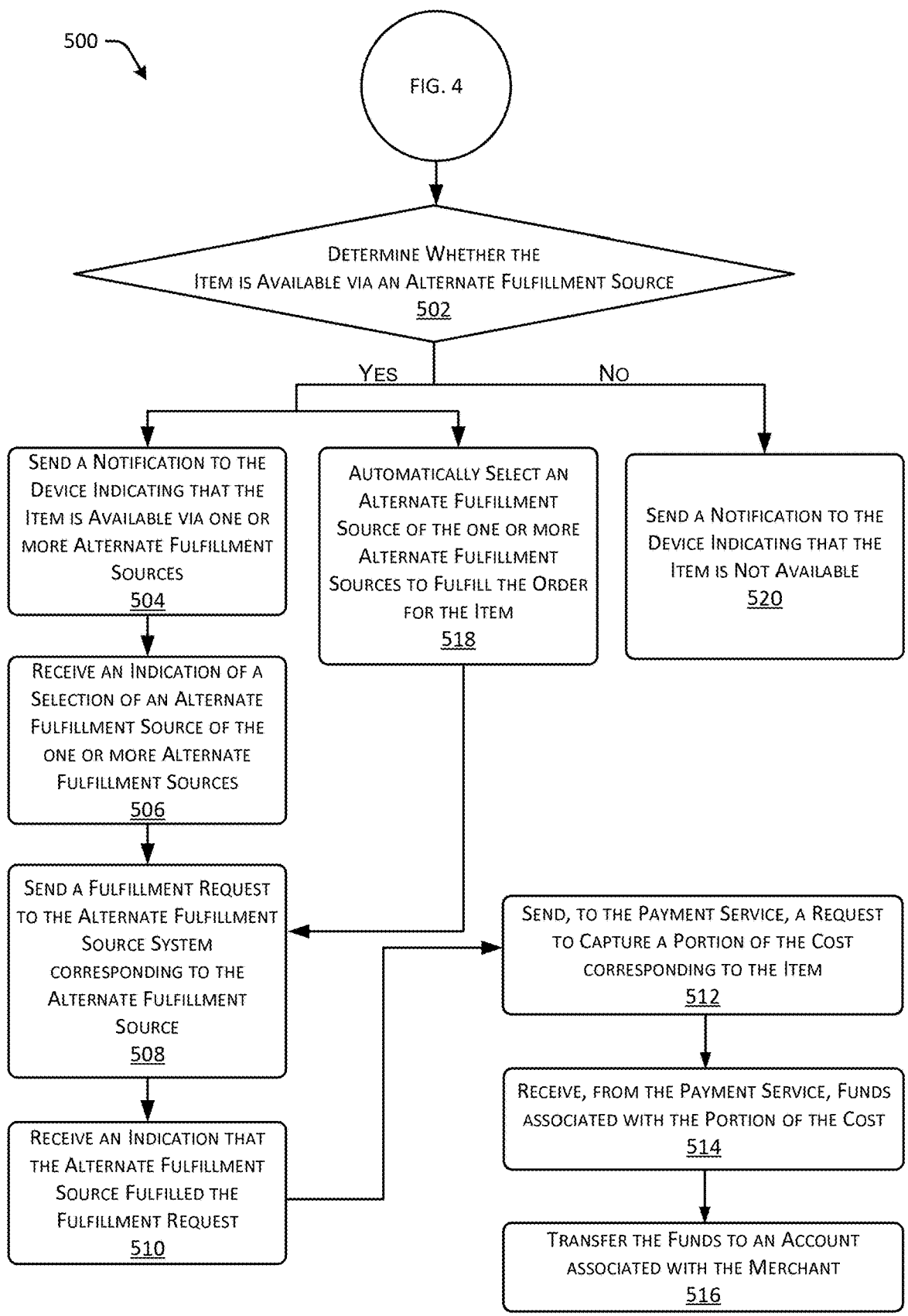
FIG. 5 depicts a non-limiting flow diagram illustrating additional aspects of the process for order fulfillment in accordance with some examples of the present disclosure.

Based at least in part on determining that an item is not available at the particular physical location, process 400 may continue as illustrated in FIG. 5.

FIG. 5 depicts a non-limiting flow diagram illustrating a process 500 for order fulfillment.

Block 502 illustrates determining whether the item is available via an alternate fulfillment source. As described above, in at least one example and responsive to receiving an order, fulfillment module 242 may access inventory database 250 to determine whether each item associated with the order may be fulfilled by merchant 204 at a current physical location of a customer. Fulfillment module 242 may determine whether a data item representative of an item is associated with inventory corresponding to the particular physical location. If an item is not associated with the inventory corresponding to the location of device 202, fulfillment module 242 may perform a search (e.g., a look-up, etc.) of inventory database 250 to determine whether an item is available via an alternate fulfillment source. That is, fulfillment module 242 may access a data item representative of the item to determine whether the data item is mapped to, or otherwise associated with, an alternate fulfillment source.

Based at least in part on determining that the item is available via an alternate fulfillment source, fulfillment module 242 may send a notification to device indicating that the item is available via one or more alternate fulfillment sources, as illustrated in block 504. In some examples, responsive to determining that an item is available via an alternate fulfillment source, fulfillment module 242 may send a notification to device 202 to identify which alternate fulfillment source the item is available from. In examples where the item is available via more than one alternate fulfillment source, fulfillment module 242 may send the notification to device 202 and may prompt device 202 for feedback regarding a preferred alternate fulfillment source.

Block 506 illustrates receiving an indication of a selection of an alternate fulfillment source of the one or more alternate fulfillment sources. In at least one example, fulfillment module 242 may receive an indication of a selection of an alternate fulfillment source of the one or more alternate fulfillment sources.

Block 508 illustrates sending a fulfillment request to an alternate fulfillment source system corresponding to the alternate fulfillment source. In at least one example, fulfillment module 242 may generate a fulfillment request for an item that is available from an alternate fulfillment source. As described above, an alternate fulfillment source may be a second physical location of merchant 204, an e-commerce platform associated with merchant 204, a fulfillment center associated with merchant 204, a vendor that provides items to merchant 204, etc. The fulfillment module 242 may send the fulfillment request to alternate fulfillment source system 212 to facilitate fulfillment of the item. In some examples, an alternate fulfillment source system 212 may correspond to an alternate device that is located at a second location of merchant 204 (e.g., a device at a second location of merchant 204) or a service provider managing an e-commerce platform and/or fulfillment center of merchant 204. In some examples, such a service provider may be payment processing service 206. In other examples, an alternate fulfillment source system 212 may correspond to a device and/or service provider associated with a vendor, etc. In at least one example, the fulfillment request may cause a notification to be presented via a user interface of the alternate device that provides an instruction for fulfillment of the item.

Block 510 illustrates receiving an indication that the alternate fulfillment source fulfilled the fulfillment request. In at least one example, fulfillment module 242 may receive an indication that the alternate fulfillment source fulfilled the fulfillment request. That is, fulfillment module 242 may receive an indication that the item was provided to the customer via the alternate fulfillment source.

Block 512 illustrates sending, to the payment service, a request to capture a portion of the cost corresponding to the item. Based at least in part on receiving an indication that the alternate fulfillment source fulfilled the fulfillment request, server-side transaction handling module 244 may send, to the payment service 210, a request to capture a portion of the cost corresponding to the item. In such examples, the capture request may include payment data, as described above.

Block 514 illustrates receiving, from the payment service, funds associated with the portion of the cost. In at least one example, responsive to sending a capture request to payment service 210, server-side transaction handling module 244 may receive funds associated with the portion of the cost. The server-side transaction handling module 244 may transfer the funds to an account associated with merchant 204, as illustrated in block 516. In an alternate example, server-side transaction handling module 244 may receive an indication that payment service 210 transferred the funds to the account associated with merchant 204 directly.

In an alternate example, based at least in part on determining that the item is available via an alternate fulfillment source, fulfillment module 242 may automatically select an alternate fulfillment source of the one or more alternate fulfillment sources to fulfil the order for the item, as illustrated in block 518. That is, in alternate examples, fulfillment module 242 may select an alternate fulfillment source without input from merchant 204. In such examples, fulfillment module 242 may select an alternate fulfillment source based on price of an item, delivery options, length of time until fulfillment, customer preferences, etc. Responsive to selecting an alternate fulfillment source, process 500 may continue at block 508, as described above.

Based at least in part on determining that the item is not available via an alternate fulfillment source, fulfillment module 242 may send a notification to device 202 indicating that the item is not available via one or more alternate fulfillment sources, as illustrated in block 520.

FIGS. 4 and 5 illustrate one example of fulfillment of an order that is stored via payment processing service 206. In examples where an order includes multiple items, the processes described in FIGS. 4 and 5 may be repeated for each item until each item is fulfilled or an occurrence of a trigger event that causes removal of the order.

In an alternate example described above, an order may be associated with a predetermined value. In such an example, server-side transaction handling module 244 may capture funds after fulfillment of one or more item(s) associated with an order. In such an example, an order may persist in order(s) database 248 until a value of the order meets a threshold value or the predetermined value is exhausted. In some examples, as described above, order management module 238 may generate a new order responsive to removing the order from order(s) database 248.

Figure 6:
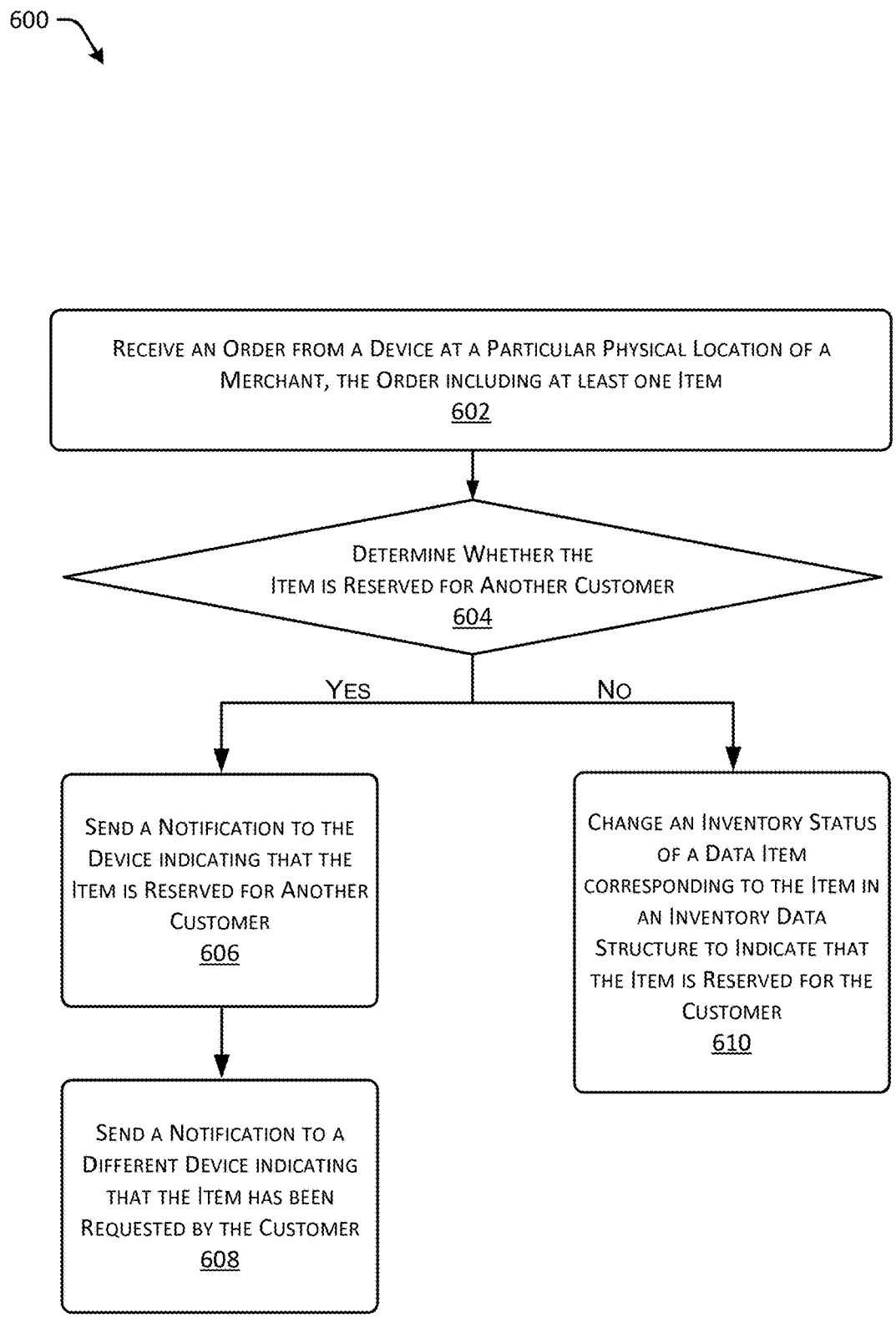
FIG. 6 depicts a non-limiting flow diagram illustrating a process for managing orders in accordance with some examples of the present disclosure.

FIG. 6 depicts a non-limiting flow diagram illustrating a process 600 for managing orders.

Block 602 illustrates receiving an order from a device at a particular physical location of a merchant, the order including at least one item. As described above, order management module 238 may be configured to receive order(s), or portions thereof, from device 202. In some examples, order management module 238 may receive an order and may store the order in order(s) database 248. That is, order management module 238 may generate and store a duplicate version of an order in order(s) database 248. In at least one example, order management module 238 may associate an identifier with an order, which may correspond to the customer associated with the order.

Block 604 illustrates determining whether the item is reserved for another customer. In at least one example, responsive to receiving an order, inventory management module 240 may query inventory database 250 to determine whether the inventory status associated with the item indicates that the item is reserved for another customer. As described above, in at least one example, responsive to receiving an order from device 202, inventory management module 240 may change an inventory status of a data item corresponding to an item in an order to indicate that the item is reserved for a customer associated with the order. Accordingly, upon receipt of a new order (or a new item that is added to an existing order), inventory management module 240 may determine whether a data item corresponding to the item is associated with an inventory status indicating that the item is reserved for another customer.

Based at least in part on determining that the item is reserved for another customer, inventory management module 240 may send a notification to device 202 indicating that the item is reserved for another customer, as illustrated in block 606. Then, merchant 204 may determine how it desires to handle the conflict. Additionally, in some examples, inventory management module 240 may send a notification to a different device indicating that the item has been requested by the customer, as illustrated in block 608. For instance, inventory management module 240 may send a notification to a POS device associated with another physical location of merchant 204, a device associated with an e-commerce platform, a device associated with a fulfillment center, a device associated with a vendor, etc. indicating that the item has been requested by the customer.

Based at least in part on determining that the item is not reserved for another customer, inventory management module 240 may change an inventory status of a data item corresponding to the item in an inventory data structure to indicate that the item is reserved for the customer, as illustrated in block 610. That is, inventory management module 240 may associate a data item corresponding to the item with an indication that the item is reserved for the customer. In some examples, inventory management module 240 may send an indication to a device associated with a fulfillment source associated with the item to instruct the device to update a local inventory to indicate that the item is reserved for the customer.

Furthermore, as described above, after an item is provided to a customer (i.e., fulfilled), inventory management module 240 may update the inventory to indicate that the item is no longer in the inventory of merchant 204 (in the case of goods) or to indicate that the item has been fulfilled (in the case of services). That is, in such examples, inventory management module 240 may update the data item corresponding to the item to indicate that the item is no longer available and/or has been fulfilled. In some examples, inventory management module 240 may make such an update automatically based on monitoring a location of a customer, as described above.

In some examples, a customer may change his or her mind prior to completing a transaction. In such examples, merchant 204 may interact with device 202 to update the order to remove the item from the order. Client-side transaction handling module 226 may send an instruction to update the order and inventory management module 240 may update the inventory to indicate that the item is no longer reserved for the customer. That is, inventory management module 240 may update the data item corresponding to the item to indicate that the item is available.

Figure 7:
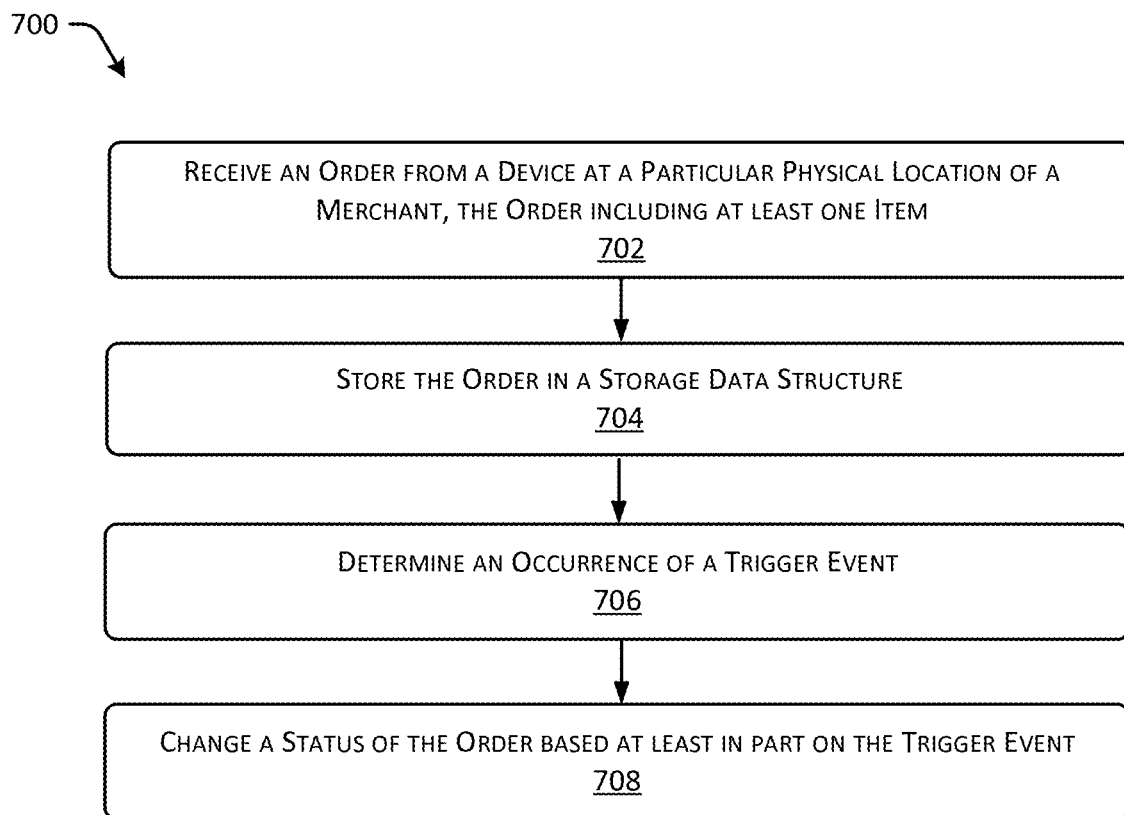
FIG. 7 depicts a non-limiting flow diagram illustrating a process for updating a status of an order based on an occurrence of a trigger event in accordance with some examples of the present disclosure.

FIG. 7 depicts a non-limiting flow diagram illustrating a process 700 for updating a status of an order based on an occurrence of a trigger event.

Block 702 illustrates receiving an order from a device at a particular physical location of a merchant, the order including at least an item. As described above, order management module 238 may be configured to receive order(s), or portions thereof, from device 202. In some examples, order management module 238 may receive an order and may store the order in order(s) database 248. That is, order management module 238 may generate and store a duplicate version of an order in order(s) database 248. In at least one example, order management module 238 may associate an identifier with an order, which may correspond to the customer associated with the order.

Block 704 illustrates storing the order. In some examples, order management module 238 may store the order in order(s) database 248. That is, order management module 238 may generate and store a duplicate version of an order in order(s) database 248. In at least one example, order management module 238 may associate an identifier with an order. In additional and/or alternate examples, order management module 238 may associate payment data (if received) with an order.

Block 706 illustrates determining a trigger event. In at least one example, an order may be stored in order(s) database 248 until an occurrence of a trigger event which causes a status of an order to indicate that the order is to be removed from a database (e.g., order(s) database 228 and/or a remote database, described below). As described above, a trigger event may correspond to an event that prompts a change to a status of an order.

In at least one example, a trigger event may correspond to an interruption in a connection between a POS device (e.g., device 202) and one or more servers (e.g., server(s) 230). For instance, an interruption may be caused by an absence of network connectivity or a loss of power to a POS device.

In an additional and/or alternative example, a trigger event may correspond to fulfillment of an order (e.g., each item of an order has been provided to a customer). In such an example, order management module 238 may determine that each item of the order has been provided to a customer and may determine a trigger event. That is, order management module 238 may track fulfillment of each item of an order and may determine a trigger event when each item of the order is fulfilled. Additionally and/or alternately, a trigger event may correspond to a lapse of a predetermined amount of time from a most recent interaction with an order. That is, a trigger event may correspond to inactivity for a predetermined amount of time. In such an example, order management module 238 may determine that an order has not been modified and/or updated in more than a predetermined amount of time, and accordingly, may determine a trigger event.

Moreover, a trigger event may correspond to an inability to fulfill an item of an order. For instance, an item may be oversold or otherwise unavailable such that it cannot be fulfilled. That is, in such an example, order management module 238 may determine a trigger event based on a determination that one or more items of an order have not been fulfilled are not able to be fulfilled, and all other items associated with an order have been fulfilled. In some examples, a trigger event may correspond to a total cost of an order exceeding a threshold cost. In at least one example, a trigger event may correspond to an explicit indication from merchant 204 and/or a customer to remove an order.

In an example, an order may be associated with a prepaid value. As item(s) are provided to a customer associated with the order, an amount corresponding to each item may be deducted from the prepaid value. In such an example, order management module 238 may determine a trigger event responsive to the prepaid value meeting a threshold value and/or exhaustion of the prepaid value. In some examples, order management module 238 may generate a new order after an order is removed from order(s) database 248.

Block 708 illustrates changing a status of the order based at least in part on the trigger event. In some examples, responsive to determining a trigger event, order management module 238 may change a status of the order. In at least one example, responsive to determining an interruption in a connection between a POS device (e.g., device 202) and one or more servers (e.g., server(s) 230) (e.g., due to an absence of network connectivity, a loss of power to a POS device, etc.), order management module 238 may change a status of an order.

In some examples, the status may be determined based on a state of the order. A state of an order may indicate one or more aspects of a transaction associated with the order that have been completed. For instance, a first state may correspond to a state where item(s) are being added to an order that is stored locally on a POS device (e.g., device 202) (e.g., adding item(s) to a virtual cart, etc.). A second state may correspond to a state where a customer has indicated that he or she would like to complete his or her order (e.g., in association with a check-out page, etc.). A third state may correspond to a state where a customer is tendering payment for the order (e.g., via a payment interface, etc.). A fourth state may correspond to a state post-transaction where a customer is reviewing the complete order and/or merchant 204 provides a receipt to the customer.

As described above, in at least one example, order management module 238 may modify a status of an order based on a state of the order. For instance, based on determining that an order is associated with a first state and/or a second state, order management module 238 may modify the status of the order to indicate that the order is to be sent to the POS device after the reestablishment of a disrupted connection with the POS device (e.g., device 202). Or, based on determining that an order is associated with a third state, order management module 238 may modify the status of the order to indicate to store the order and request payment data upon reestablishment of a connection with the POS device (e.g., device 202). Moreover, based on determining that an order is associated with a fourth state, order management module 238 may modify the status of the order to indicate to store the order and send a receipt to the POS device upon reestablishment of a connection with the POS device (e.g., device 202). Or, based on determining that an order is associated with a fourth state, order management module 238 may modify the status of the order to indicate to store the order and send a receipt to the POS device via an alternate technology (e.g., Bluetooth®, etc.) so that the customer does not have to wait to leave the physical location of merchant 204.

In additional and/or alternative examples, responsive to determining a trigger event, order management module 238 may change a status of the order to indicate that the order is to be removed from order(s) database 228 and/or order(s) database 248. For instance, responsive to determining fulfillment of an order (e.g., each item of an order has been provided to a customer), a lapse of a predetermined amount of time from a most recent interaction with an order, an inability to fulfill an order, a total cost of an order exceeds a threshold cost, an explicit indication from merchant 204 and/or a customer to remove an order, etc., order management module 238 may change a status of the order to indicate that the order is to be removed from order(s) database 228 and/or order(s) database 248.

Figure 8:
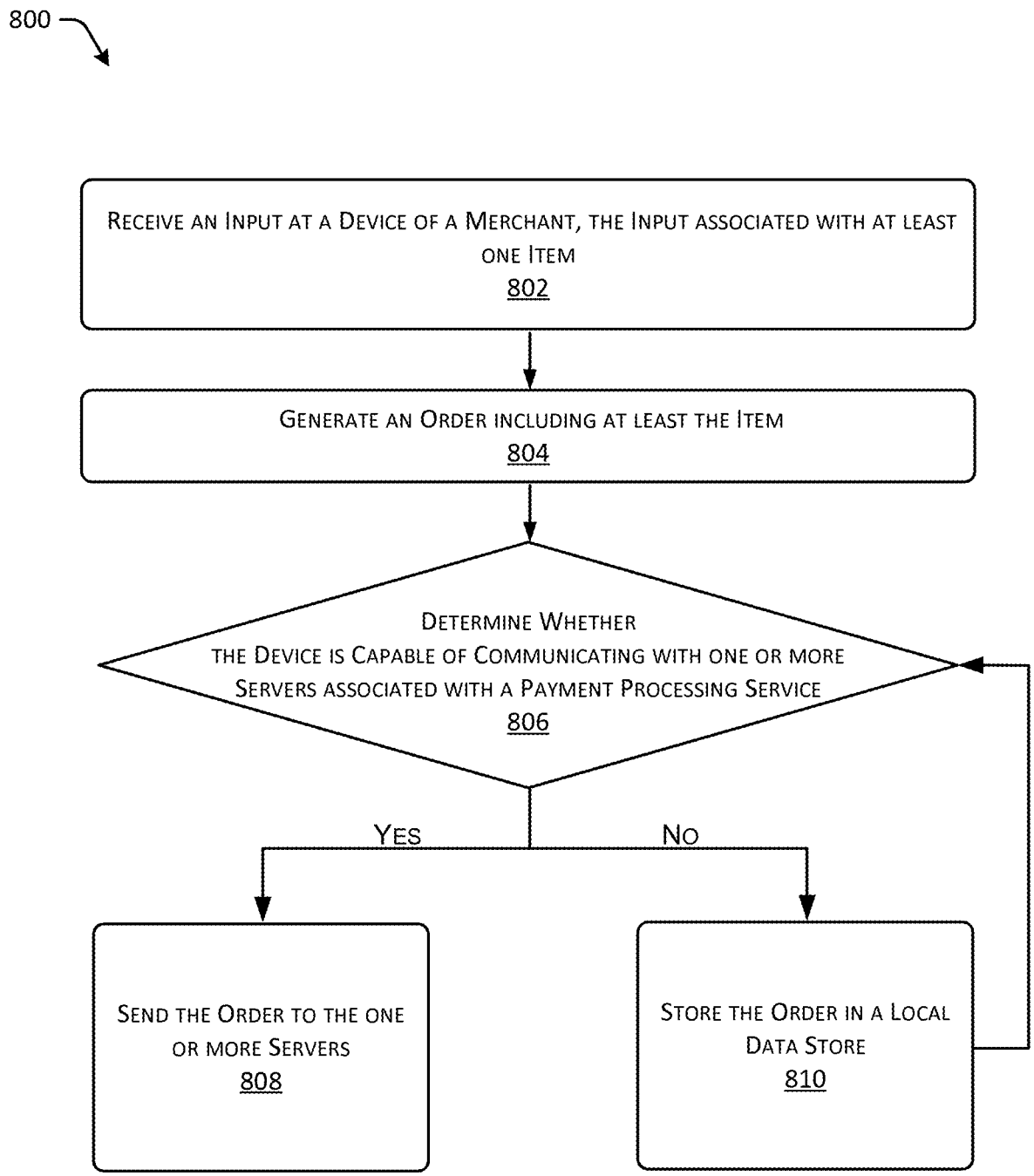
FIG. 8 depicts a non-limiting flow diagram illustrating a process for synchronizing orders between a point-of-sale device and one or more servers in accordance with some examples of the present disclosure.

FIG. 8 depicts a non-limiting flow diagram illustrating a process 800 for synchronizing orders between a point-of-sale device and one or more servers in accordance with some examples of the present disclosure.

Block 802 illustrates receiving an input at a device of a merchant, the input associated with at least one item. As described above, merchant 204 may interact with device 202 to indicate a customer desires to purchase one or more items. For instance, merchant 204 may utilize a scanning device to scan an identifier associated with an item, manually enter information about an item, select an item from a menu presented via a graphical user interface presented via device 202, etc. to indicate that a customer desires to purchase the item.

Block 804 illustrates generating an order including the at least one item. Responsive to receiving the input, client-side transaction handling module 226 may generate an order for the item. As described above, an order may be an electronic record of one or more items that a customer intends to purchase. In at least one example, upon generation of the order, client-side transaction handling module 226 may store the order locally in order(s) database 228.

Block 806 illustrates determining whether the device is capable of communicating with one or more servers associated with a payment processing service. In at least one example, client-side transaction handling module 226 may send a query to network interface 224 to determine whether device 202 is capable of transmitting the order via the network(s) 214.

Based at least in part on determining that the device is capable of communicating with one or more servers associated with the payment processing service, client-side transaction handling module 226 may send the order to server(s) 230, as illustrated in block 808. That is, based at least in part on determining that device 202 is operating in online mode and is capable of transmitting data via the network(s), client-side transaction handling module 226 may send the order to payment processing service 206.

Based at least in part on determining that the device is not capable of communicating with one or more servers associated with the payment processing service, client-side transaction handling module 226 may store the order in order(s) database 228, as illustrated in block 810. That is, based at least in part on determining that device 202 is operating in offline mode and is not capable of transmitting data via the network(s), client-side transaction handling module 226 may refrain from sending the order to payment processing service 206 until device 202 reenters online mode (e.g., a connection is reestablished). In such an example, the order may remain locally stored in order(s) database 228. In at least one example, client-side transaction handling module 226 may add an indicator to the order that indicates that the order is to be sent to payment processing service 206 upon reestablishment of a connection (e.g., reboot following a power failure, network connection restored, etc.).

In at least one example, responsive to device 202 entering online mode, client-side transaction handling module 226 may send a request to server(s) 230 for updated inventory data. In such an example, inventory management module 240 may send updated inventory data to client-side transaction handling module 226 for updating inventory database 229. Furthermore, responsive to device 202 entering online mode, client-side transaction handling module 226 may send update(s) to locally stored order(s) to server(s) 230.

Figure 9:
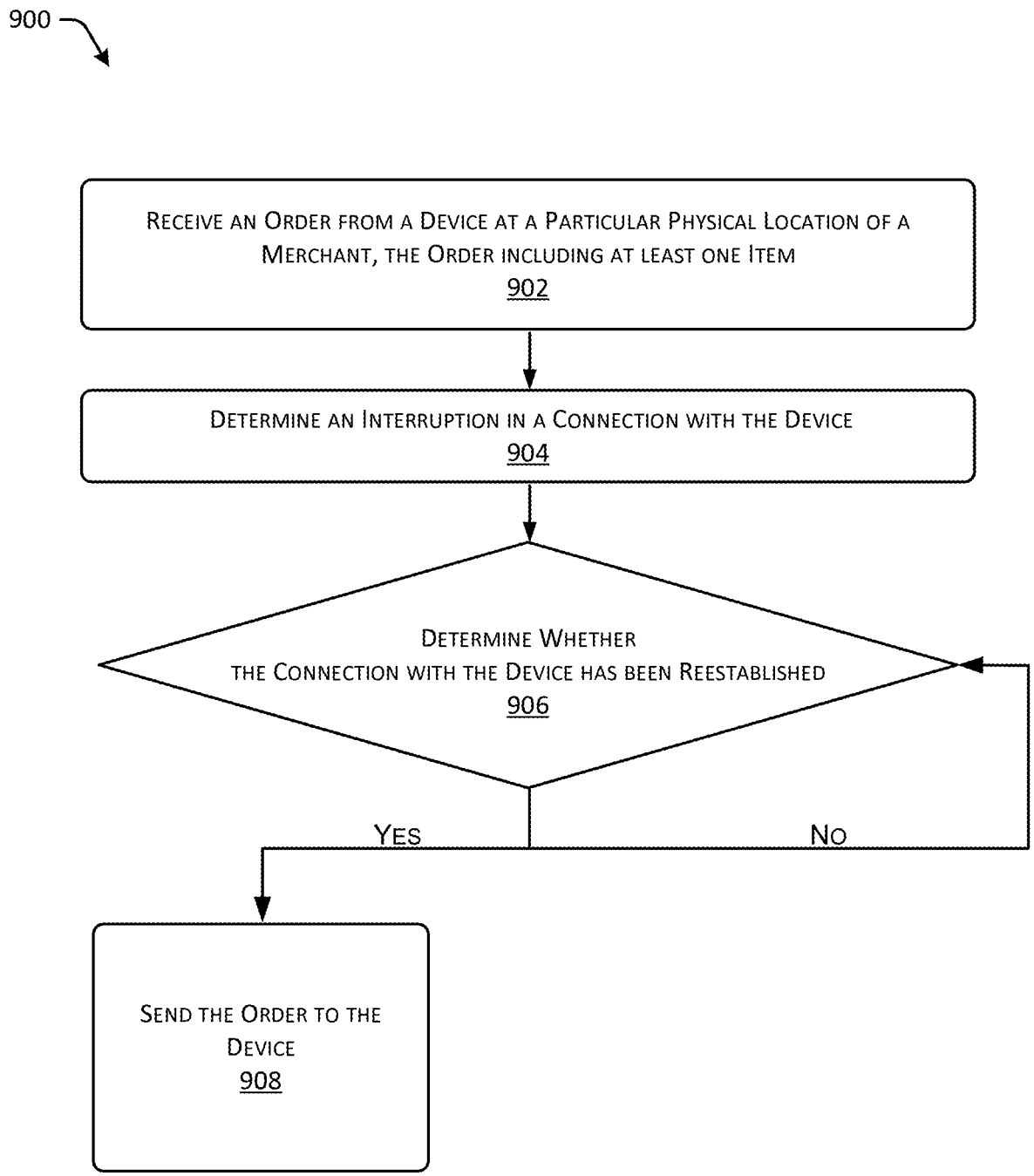
FIG. 9 depicts a non-limiting flow diagram illustrating a process for managing orders in accordance with some examples of the present disclosure.

FIG. 9 depicts a non-limiting flow diagram illustrating a process 900 for managing orders in accordance with some examples of the present disclosure. As described above, server(s) 230 may persistently store order(s) such that in the event of a power outage or some other network outage and/or unexpected shut-off of a device (e.g., device 202), order(s) may be saved for subsequent access by merchant 204. Process 900 is directed to managing orders responsive to determining an interruption in a connection between device 202 and server(s) 230.

Block 902 illustrates receiving an order from a device at a particular physical location of a merchant, the order including at least one item. As described above, order management module 238 may be configured to receive order(s), or portions thereof, from device 202. In some examples, order management module 238 may receive an order and may store the order in order(s) database 248. That is, order management module 238 may generate and store a duplicate version of an order in order(s) database 248. In at least one example, order management module 238 may associate an identifier with an order, which may correspond to the customer associated with the order.

Block 904 illustrates determining an interruption in a connection with the device. As described above, in some examples, device 202 may experience a power outage or some other network outage and/or unexpected shut-off of device 202 (e.g., due to a battery drain of a battery of the device, etc.). In at least one example, network interface 236 may provide an indication that a connection with device 202 has been lost and/or otherwise is not present. Additionally and/or alternatively, in some examples, server(s) 230 may monitor status(es) of devices connected to the server(s) 230 and may determine that device 202 lost power. As described above, such an interruption may correspond to a trigger event, which may cause order management module 238 to modify a status of the order. In some examples, order management module 238 may modify the status of the order based on the state of the order. In at least one example, the status of the order may be updated to indicate that the order is to be sent to device 202 upon determining that a connection is reestablished. In other examples, the status of the order may be updated to indicate that the other is to be processed in another manner.

Block 906 illustrates determining whether the connection with the device is reestablished. In at least one example, server(s) 230 may send a query to determine whether device 202 is connected to network(s) 214. Server(s) 230 may send such a query at a predetermined frequency, after a lapse of a predetermined period of time, etc. Responsive to receiving a response from device 202, server(s) 230 may determine that device 202 is connected to networks(s) 214. Additionally and/or alternatively, server(s) 230 may receive a communication from device 202 and, based on receiving the communication, may determine that device 202 is connected to network(s) 214. Based on determining that the connection with the device is reestablished, order management module 238 may send the order to the device, as illustrated in block 908. That is, based on determining that device 202 is connected to server(s) 230 via network(s) 214, order management module 238 may send the order to device 202. In at least one example, device 202 may send a request to server(s) 230 for the order. That is, responsive to reestablishing a connection, device 202 may send a request to access the order and order management module 238 may send the order to device 202 based on receiving the request. Additionally and/or alternatively, in some examples, order management module 238 may receive an update to the order after the connection is reestablished. As a result, order management module 238 may update the order.

Based on determining that the connection with the POS device is not reestablished, process 900 may return to block 908 to determine whether the connection with the POS device is reestablished.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
   an application running on a point-of-sale (POS) device associated with a merchant, the POS device being located at a brick-and-mortar location of the merchant, the application comprising instructions to:
   receive, by the application and via a graphical user interface presented via the POS device, input indicating that a customer desires to purchase a consumer good available for purchase at the brick-and-mortar location of the merchant;
   add, by the application, an indication of the consumer good to an order associated with the customer; and
   send, from the application, the order to one or more servers associated with a remotely located payment processing service via a network; and
   the one or more servers of the remotely located payment processing service, comprising:
   one or more processors; and
   one or more computer-readable instructions executable by the one or more processors to:
   receive, by the one or more servers, the order from the POS device at a first time;
   store, by the one or more servers, the order in a storage data structure associated with the one or more servers;
   determine, by the one or more servers and at a second time after the first time, an interruption in a connection with the POS device, wherein the interruption prevents the one or more servers from connecting, via the network, to the POS device;
   change, by the one or more servers, a status of the order based at least in part on the interruption, the status indicating that the order is to be sent to the POS device upon determining that the connection is reestablished;
   based at least in part on receiving a communication from the POS device, determine, by the one or more servers and at a third time after the second time, reestablishment of the connection with the POS device, wherein the reestablishment of the connection enables the one or more servers to connect, via the network, to the POS device; and
   send, by the one or more servers, the order from the one or more servers to the POS device at a fourth time after the third time and based at least in part on (i) the status indicating that the order is to be sent to the POS device upon determining that the connection is reestablished and (ii) determining the reestablishment of the connection with the POS device.

2. The system as claim 1 recites, wherein determining the interruption is based at least in part on determining an absence of network connectivity.

3. The system as claim 1 recites, wherein determining the interruption is based at least in part on determining a loss of power to the POS device.

4. The system as claim 1 recites, wherein the one or more computer-readable instructions are executable by the one or more processors further to:
   receive, by the one or more servers and from the POS device and after determining the reestablishment of the connection with the POS device, a request for the order; and
   send, by the one or more servers, the order to the POS device further based at least in part on receiving the request for the order.

5. The system as claim 1 recites, wherein the application further comprises instructions to:
   determine, by the application, an interruption in a connection with the one or more servers;
   receive, by the application, an update to the order;
   store, by the application, the update to the order in a local storage data structure;
   determine, by the application, a reestablishment of the connection with the one or more servers; and
   send, by the application, the update to the one or more servers.

6. The system as claim 5 recites, wherein the one or more computer-readable instructions are executable by the one or more processors further to:
   receive, by the one or more servers and from the POS device and after determining the reestablishment of the connection with the POS device, the update to the order; and
   update, by the one or more servers, the order.

7. A computer-implemented method performed by one or more servers of a payment processing service, the computer-implemented method comprising:
- receiving, at the one or more servers and from a point-of-sale (POS) device operated by a merchant, an order associated with at least one item available for purchase at a physical location of the merchant;
- storing, by the one or more servers, the order in a storage data structure of the one or more servers;
- determining, by the one or more servers, an interruption in a connection between the one or more servers and the POS device, wherein the interruption prevents the one or more servers from connecting, via a network, to the POS device; and
- determining, by the one or more servers, a status of the order based at least in part on the interruption, wherein the status indicates whether the order is to be sent to the POS device when the connection is reestablished.

8. The computer-implemented method as claim 7 recites, wherein determining the interruption is based at least in part on determining an absence of network connectivity.

9. The computer-implemented method as claim 7 recites, wherein determining the interruption is based at least in part on determining a loss of power to the POS device.

10. The computer-implemented method as claim 7 recites, further comprising:
- determining, by the one or more servers, a reestablishment of the connection with the POS device; and
- sending, by the one or more servers, based at least in part on determining the reestablishment of the connection with the POS device and based at least in part on the status indicating that the order is to be sent to the POS device upon reestablishment of the connection, the order to the POS device.

11. The computer-implemented method as claim 7 recites, further comprising:
- determining, by the one or more servers, a reestablishment of the connection with the POS device;
- receiving, by the one or more servers and from the POS device and after determining the reestablishment of the connection with the POS device, a request for the order; and
- sending, by the one or more servers and based at least in part on the request for the order, the order to the POS device.

12. The system as claim 1 recites, wherein the one or more computer-readable instructions are executable by the one or more processors further to:
- determine, by the one or more servers, a state associated with the order; and
- determine, by the on or more servers, the status based at least in part on the state associated with the order.

13. The computer-implemented method as claim 7 recites, further comprising:
- determining, by the one or more servers, a state associated with the order; and
- determining, by the one or more servers, the status based at least in part on the state associated with the order.

14. The computer-implemented method as claim 13 recites, wherein the state is associated with adding the at least one item to the order, and the status indicates that order is to be sent to the POS device when the connection is reestablished.

15. The computer-implemented method as claim 13 recites, wherein the state is associated with a checkout user interface, and the status indicates that the order is to be sent to the POS device when the connection is reestablished.

16. The computer-implemented method as claim 13 recites, wherein the state is associated with a payment by a customer, and the status indicates that (i) the order is not to be sent to the POS device when the connection is reestablished, (ii) the order is to be stored, and (iii) a receipt is to be sent to the POS device, via the network, when the connection is reestablished.

17. The computer-implemented method as claim 13 recites, wherein the state is associated with a post-transaction state, and the status indicates that (i) the order is not to be sent to the POS device when the connection is reestablished, (ii) the order is to be stored, and (iii) a receipt is to be sent to the POS device via an alternate mechanism.

18. One or more computer-readable instructions executable by one or more processors to perform operations comprising:
- receiving, at one or more servers and from a point-of-sale (POS) device operated by a merchant, an order associated with at least one item available for purchase at a physical location of the merchant;
- storing, by the one or more servers, the order in a storage data structure of the one or more servers;
- determining, by the one or more servers, an interruption in a connection between the one or more servers and the POS device, wherein the interruption prevents the one or more servers from connecting, via a network, to the POS device; and
- determining, by the one or more servers, a status of the order based at least in part on the interruption, wherein the status indicates whether the order is to be sent to the POS device when the connection is reestablished.

19. The one or more computer-readable instructions as claim 18 recites, the operations further comprising:
- determining, by the one or more servers, a reestablishment of the connection with the POS device; and
- sending, by the one or more servers, based at least in part on determining the reestablishment of the connection with the POS device and based at least in part on the status indicating that the order is to be sent to the POS device upon reestablishment of the connection, the order to the POS device.

20. The one or more computer-readable instructions as claim 18 recites, the operations further comprising:
- determine, by the one or more servers, a state associated with the order; and
- determine, by the one or more servers, the status based at least in part on the state associated with the order.

* * * * *